US010931099B1

(12) United States Patent
Flor et al.

(10) Patent No.: US 10,931,099 B1
(45) Date of Patent: Feb. 23, 2021

(54) SYSTEMS AND METHODS FOR AUTOMATIC THRESHOLD SENSING FOR UVLO CIRCUITS IN A MULTI-BATTERY ENVIRONMENT

(71) Applicant: CalAmp Corp., Irvine, CA (US)

(72) Inventors: Justin Flor, Irvine, CA (US); Russell Cook, Irvine, CA (US)

(73) Assignee: CalAmp Corp., Irvine, CA (US)

( * ) Notice: Subject to any disclaimer, the term of this patent is extended or adjusted under 35 U.S.C. 154(b) by 0 days.

(21) Appl. No.: 16/801,750

(22) Filed: Feb. 26, 2020

(51) Int. Cl.
| H02H 7/18 | (2006.01) |
| B60R 16/033 | (2006.01) |
| H02H 3/24 | (2006.01) |

(52) U.S. Cl.
CPC ............ *H02H 7/18* (2013.01); *B60R 16/033* (2013.01); *H02H 3/24* (2013.01)

(58) Field of Classification Search
CPC ............ H02H 7/18; H02H 3/24; H02H 3/243; H02H 3/247; B60R 16/033
See application file for complete search history.

(56) References Cited

U.S. PATENT DOCUMENTS

| 4,855,722 | A | 8/1989 | Mostyn et al. |
| 5,473,279 | A | 12/1995 | D'Angelo et al. |
| 7,561,388 | B2 | 7/2009 | Sung et al. |
| 7,825,636 | B2 | 11/2010 | Partin |
| 7,932,133 | B2 | 4/2011 | Cogan et al. |
| 8,508,166 | B2 | 8/2013 | Marcinkiewicz et al. |
| 8,742,741 | B2 | 6/2014 | Zhao |
| 8,780,515 | B2 * | 7/2014 | Chien ............ H02M 1/32 361/90 |
| 8,842,780 | B2 | 9/2014 | Kamath et al. |
| 2014/0204628 | A1 | 7/2014 | Gaknoki et al. |

OTHER PUBLICATIONS

International search report for PCT application No. PCT/US20/19852, dated May 22, 2020 (21 pages).

* cited by examiner

*Primary Examiner* — Jung Kim
(74) *Attorney, Agent, or Firm* — Barnes & Thornburg LLP

(57) ABSTRACT

A disclosed under-voltage lockout (UVLO) circuit includes an automatic UVLO threshold configuration. The UVLO circuit may include an over-voltage protection circuit that receives power from a power source, a peak detector that detects a peak voltage output for the power source, a voltage threshold generator that sets a UVLO threshold based on the peak voltage output, and a comparator that compares an instantaneous voltage with the UVLO threshold and configures an operating mode of a device based on the comparison.

17 Claims, 24 Drawing Sheets

SYSTEMS AND METHODS FOR AUTOMATIC THRESHOLD SENSING FOR UVLO CIRCUITS IN A MULTI-BATTERY ENVIRONMENT

FIELD OF THE INVENTION

The present invention relates to systems and methods for dynamically field configurable Under-voltage Lockout (UVLO) circuits that can learn and automatically adjust a voltage threshold based on in the field measurements in accordance with embodiments of the invention are disclosed. In particular, a UVLO circuit in accordance with many embodiments of the invention can be incorporated within a telematics unit that can be installed in a variety of different types of vehicles with different power and/or battery capabilities, and the UVLO circuit can automatically learn and adjust a voltage threshold for the UVLO circuit based on in the field measurements made for the particular vehicle.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording vehicle information/data related to the operation of the vehicle and providing that information for analysis, whether in real-time or not, such as during a time when the vehicle is being serviced. The vehicle information/data (telematics data) generated by a telematics unit can be used in a variety of applications, such as fleet tracking, shipment tracking, insurance calculations, and in vehicle management and service.

The Undervoltage-Lockout or UVLO is an electronic circuit used to turn off the power of an electronic device in the event of the voltage dropping below the operational value. For instance, in embedded devices, UVLOs can be used to monitor the battery charge or turn off the circuit if the battery voltage drops below a specific threshold, thus protecting the associated equipment. Some variants may also have an upper threshold. Undervoltage lockout can be a part of many electronic devices. For instance, it is widely used in many electrical ballast circuits to switch them off in the event of voltage falling below the operational value.

Undervoltage-lockout should be used for switched-mode power supplies when the output impedance of an electrical network is higher than the input impedance of the regulator in order to prevent oscillations and possible malfunctions of the regulator.

SUMMARY OF THE INVENTION

Systems and methods for dynamically field configurable under voltage lock out (UVLO) circuits that can learn and automatically adjust a voltage threshold based on in the field measurements in accordance with embodiments of the invention are described. In an embodiment, an under-voltage lockout (UVLO) circuit with automatic UVLO threshold configuration includes: an over-voltage protection circuit that receives power from a power source, a peak detector that detects a peak voltage output for the external power source, a voltage threshold generator that sets a UVLO threshold based on the peak voltage output, and a comparator that compares an instantaneous voltage with the UVLO threshold and configures an operating mode of a device based on the comparison.

In still a further embodiment, the UVLO threshold is set to a percentage of the peak voltage output.

In still a further embodiment again, the UVLO threshold is selected from several predetermined UVLO thresholds based on the peak voltage output.

In still yet a further embodiment, the voltage threshold generator further sets a second UVLO threshold that is less than the UVLO threshold for hysteresis control.

In still another further embodiment, configuring an operating mode of the device includes shutting down power to the device when the instantaneous voltage is below the UVLO threshold.

In still a further embodiment, configuring an operating mode of the device includes enabling power to the device when the instantaneous voltage is at least equal to the UVLO threshold.

In still a further embodiment again, the UVLO further includes a comparator that compares the peak voltage output with several predetermined threshold values set for different standardized power sources to determine characteristics of the power source.

In yet a further embodiment, the characteristics of the power source are selected from the group comprising a 12V system and a 24V system.

In still a further embodiment, the characteristics of the power source include a number of cells in a battery of the power source.

In yet a further embodiment, the over-voltage protection circuit further includes: a fuse with a Zener and clamping diode to cause an open circuit when a voltage across the Zener exceeds a reverse avalanche voltage.

In still a further embodiment again, the UVLO circuit further includes a low current sourcing voltage regulator.

In still a further embodiment again, the UVLO circuit further includes a sample and hold circuit, wherein an input voltage is sampled with the sample and hold circuit when a voltage set as a last detected peak voltage is less than a voltage from the power source.

In still yet a further embodiment again, the sample and hold circuit includes a high impedance input and low impedance output circuit to sample the voltage and charge a capacitor to the sample voltage.

In still a further embodiment again, the UVLO circuit further a digital pot that includes a comparator to provide feedback indicating when the digital pot increases, where using the incremental tracking feedback sets the peak detector to hold onto the peak voltage.

In yet still a further embodiment again the UVLO circuit provides a signal that disconnects power from the power source to the device.

In still a further embodiment again, the UVLO circuit may be programmed at time of production for multiple battery environments.

In still a further embodiment again, the UVLO circuit may be dynamically re-programmed for different battery environments.

DETAILED DESCRIPTION

Figure 1:
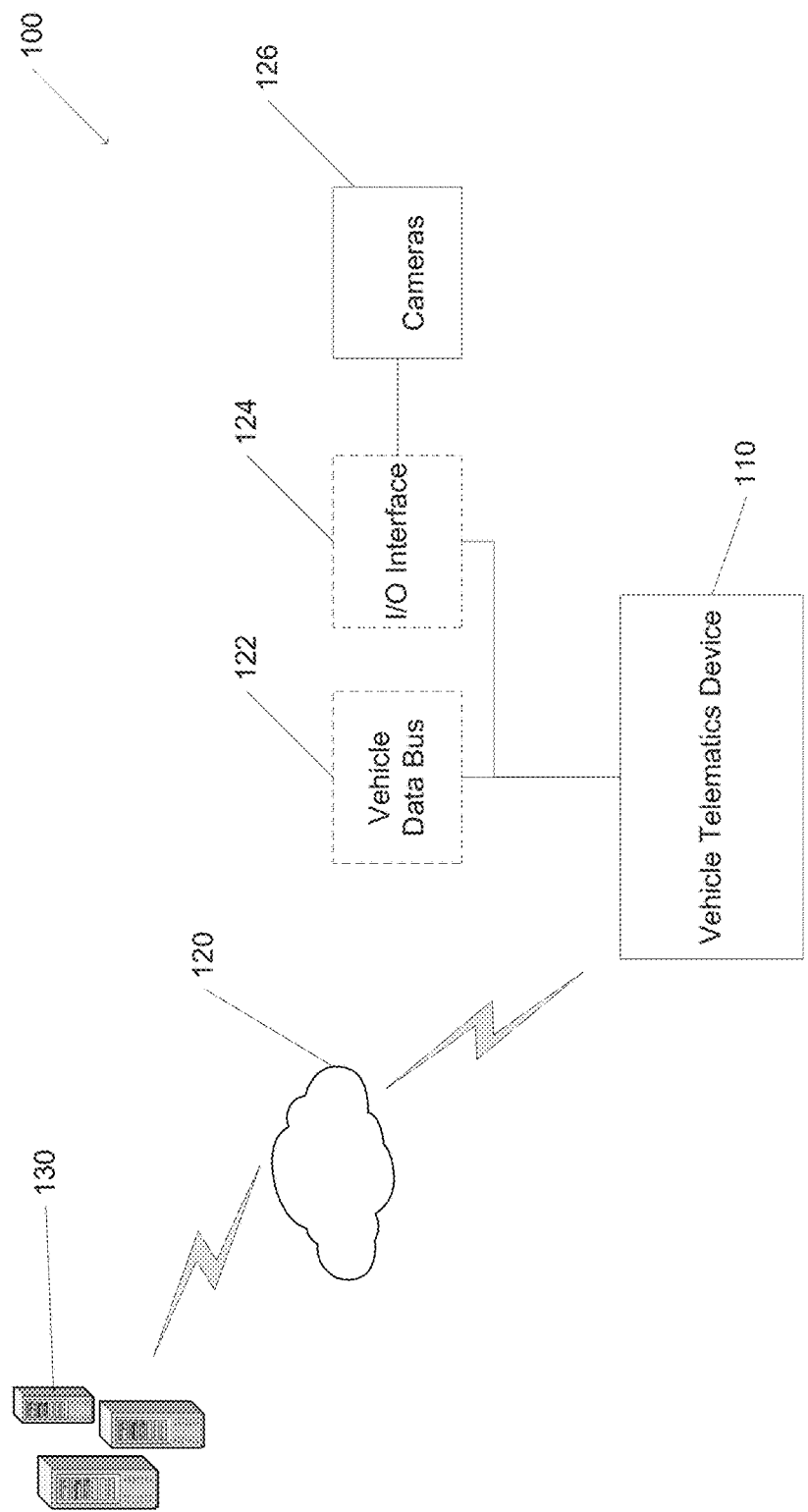
FIG. 1 illustrates a conceptual diagram of a vehicle telematics system in accordance with an embodiment of the invention.

Turning now to the drawings, systems and methods for dynamically field configurable Undervoltage Lockout (UVLO) circuits that can learn and automatically adjust a voltage threshold based on in the field measurements in accordance with embodiments of the invention are disclosed. In particular, a UVLO circuit in accordance with many embodiments of the invention can be incorporated within a telematics unit that can be installed in a variety of different types of vehicles with different power and/or battery capabilities, and the UVLO circuit can automatically learn and adjust a voltage threshold for the UVLO circuit based on in the field measurements made for the particular vehicle. In many embodiments, the UVLO circuit threshold can protect a battery and prevent a system from entering an uncontrolled state (e.g., cycling, resetting, among others). In many embodiments, the UVLO circuit can also prevent a battery burnout, battery draining, among other conditions.

Telematics services are used in a variety of vehicles. The devices employed to deliver the services are typically powered from the main battery power system of the vehicle. The vehicle power systems can differ based on the type of vehicle, including different numbers of batteries in the power system of a particular vehicle. It is highly desirable to configure an input threshold of a UVLO circuit such that is representative of the power system of the vehicle in which the device is installed. This threshold can be used to protect the power source from being over drained as well as provide protection against a brown out condition on the telematics system caused by a dropping power source.

Furthermore, many electronic devices, including telematics units, can be designed to operate with low supply voltages, however, they may still need a minimum voltage to operate correctly. This may be especially important in battery-powered applications, where the available voltage can decrease as the battery discharges. When a supply voltage is too low, several things can occur, including, a bandgap reference may generate a wrong voltage, logic functions can generate the wrong control signals, power transistors may be switched only partially on or partially off. Accordingly, a UVLO circuit functions to ensure that a device does not function or perform any operations until the supply voltage is high enough for predictable behavior, providing robust system performance.

Existing power regulation within telematics devices only provides one fixed threshold. Accordingly, many embodiments provide a UVLO circuit that is able to identify different standard power systems through sensing of the power system and automatically configuring an input threshold of the UVLO circuit to disable the telematics device, where the threshold is configured for the particular power system.

Many embodiments of the UVLO circuit can use a peak detector to find a true system voltage and use that value to set a UVLO threshold level that ensures a battery will not be harmed by the circuit. In many embodiments, the UVLO may cut off power to the system in order to prevent undesired operation at a low voltage. Accordingly, many embodiments of the UVLO circuit are able to protect an external battery from being drained when the battery is showing signs of depletion. Furthermore, many embodiments of the UVLO circuit protect the internal voltage rail from a brownout condition that may be caused by a drooping battery.

Accordingly, many embodiments provide a UVLO that can be configured in the field to achieve a desired functionality and provide wider versatility. In particular, many existing standard UVLO circuits provide a static voltage set point in which it "locks out" the power supply from the rest of the circuit/device preventing undesired situations when powered at a voltage lower than intended for a given electronic device to function. For example, for a device that is designed to work with a 12V system vehicles and also 24V system vehicles, with a standard UVLO, there may need to be two devices developed, one for each voltage level, otherwise, the lock out voltage may need to be set to less than 12V, even when being used by the 24V system. As such, this may potentially drain a 24V battery even when it is "dead" due to its higher voltage meeting the UVLO limit. Accordingly, many embodiments provide a UVLO that is dynamically configurable based on in the field measurements as described in detail throughout this application.

Vehicle Telematics Systems

Vehicle telematics systems in accordance with embodiments of the invention can incorporate a UVLO circuit with automatic threshold configuration for different power systems to determine when to shut off power to a telematics devices installed in a vehicle. A conceptual diagram of a vehicle telematics system in accordance with an embodiment of the invention is shown in FIG. 1. The vehicle telematics system 100 includes a vehicle telematics device 110 that can communicate with a remote server system 130, a vehicle data bus 122, and/or an input/output (I/O) interface 124 as appropriate to the requirements of specific applications of embodiments of the invention. The input/output interface 124 can connect to any of a variety of external devices, including one or more cameras 126 that can be configured to capture road-side and driver-side video. In many embodiments, the input/output interface can be a wired or wireless (e.g., Bluetooth) interface, including an Android interface that can communicate with a software associated with the camera(s).

In a variety of embodiments, the vehicle telematics device 110 communicates with the remote server system 130 via a network 120. In a variety of embodiments, the network 120 is the Internet. In many embodiments, the network 120 is any wired or wireless network, such as a cellular network, between the vehicle telematics device 110 and the remote server system 130. In a number of embodiments, the remote server system 130 implemented using a single server system. In several embodiments, the remote server system 130 is implemented using multiple server systems.

In a variety of embodiments, the vehicle telematics device 110 is installed in a vehicle having a vehicle data bus 122. The vehicle telematics device 110 can obtain data from any of a variety of vehicle devices connected to the vehicle data bus 122 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, and/or acceleration determination devices. Systems and methods for connecting to a vehicle data bus that can be utilized in accordance with embodiments of the invention are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety.

The vehicle telematics device 110 can include any of a variety of sensors and/or devices, including those described above with respect to the vehicle data bus and those described in more detail below, to obtain data regarding the status of the vehicle. The vehicle telematics device 110 can also communicate with any of a variety of sensors and/or devices using the I/O interface 124. The I/O interface 124 can be any connection, including wired and wireless connections, as appropriate to the requirements of specific applications of embodiments of the invention. In several embodiments, the vehicle telematics device 110 is capable of executing scripts to read data and/or perform particular processes. These scripts can be pre-loaded on the device and/or obtained from the remote server system 130, and/or the I/O interface 124 as appropriate to the requirements of specific applications of embodiments of the invention. The vehicle telematics device 110 can be self-powered and/or connected into the electrical system of the vehicle in which the vehicle telematics device 110 is installed. In a variety of embodiments, the vehicle telematics device is powered via the vehicle data bus 122 and/or the I/O interface 124. In many embodiments, the vehicle telematics device 110 utilizes a Global Positioning System (GPS) receiver in order to determine the location, speed, and/or acceleration of the vehicle. However, it should be noted that any location-determining techniques, such as cellular tower triangulation, wireless network geolocation techniques, and dead reckoning techniques, could be utilized as appropriate to the requirements of specific applications of embodiments of the invention.

In a variety of embodiments, the vehicle telematics device 110 and/or remote server system 130 provides a user interface allowing for visualizing and interacting with the data. In several embodiments, the vehicle telematics device 110 and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of a vehicle telematics system in accordance with embodiments of the invention are discussed above and illustrated in FIG. 1, a variety of architectures, including sensors and other devices and techniques not specifically described above, can be utilized in accordance with embodiments of the invention. Furthermore, the processes described herein can be performed using any combination the vehicle telematics devices and/or the remote server systems as appropriate to the requirements of specific applications of embodiments of the invention.

Vehicle Telematics Devices and Remote Server Systems

Figure 2A:
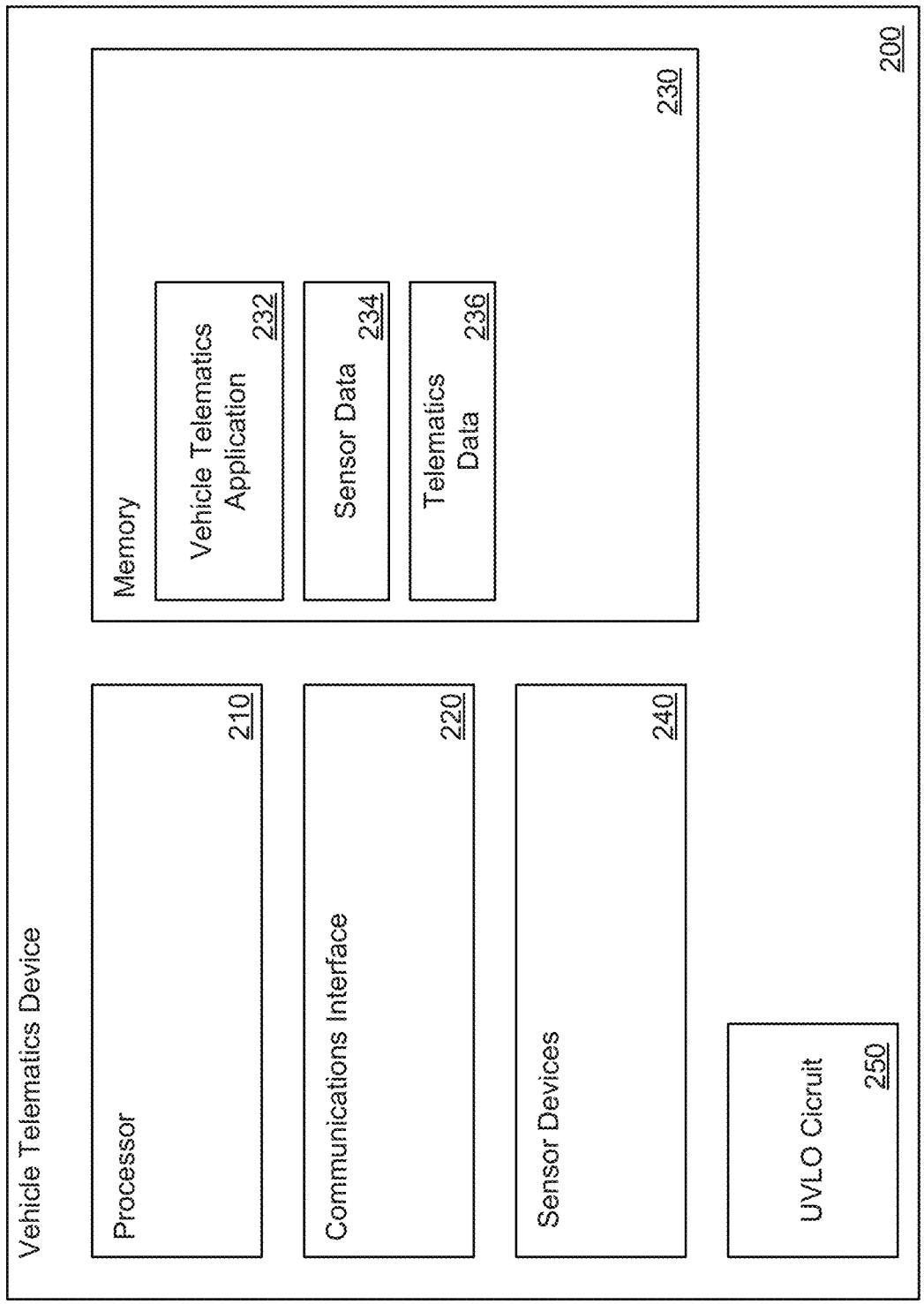
FIG. 2A is a conceptual block diagram of a vehicle telematics device in accordance with an embodiment of the invention.

FIG. 2A is a conceptual block diagram of a vehicle telematics device in accordance with an embodiment of the invention. Vehicle telematics devices and remote server systems in accordance with the embodiments can transmit and receive data regarding the vehicle. The vehicle telematics device 200 includes a processor 210 in communication with memory 230. The vehicle telematics device 200 can also include one or more communication interfaces 220 capable of sending and receiving data. In a number of embodiments, the communication interface 220 is in communication with the processor 210, the memory 230, and/or the sensor device(s) 240. In several embodiments, the memory 230 is any form of storage configured to store a variety of data, including, but not limited to, a vehicle telematics application 232, sensor data 234, telematics data 236. In many embodiments, the vehicle telematics application 232, sensor data 234, and/or telematics data 236 are stored by using an external server system and received by the vehicle telematics device 200 by using the communications interface 220.

The vehicle telematics device can include a UVLO circuit 250 that can automatically configure an input threshold to disable the telematics device based on sensing of the power system in which the telematics device is installed, as different vehicles can have different power systems and different numbers of batteries in the power systems. Accordingly, in many embodiments, the UVLO circuit 250 can protect a power source from being over drained as well as provide protection against a brown out condition on the telematics device caused by a dropping power source.

Sensor devices 240 can include RPM sensors, voltage sensors, GPS receivers, noise sensors, vibration sensors, acceleration sensors, weight sensors, and any other device capable of measuring data regarding a vehicle as appropriate to the requirements of specific applications of the embodiments. Sensor devices 240 can be included within the vehicle telematics device 200 and/or located external to the vehicle telematics device 200. The vehicle telematics device 200 can communicate with external sensor devices by using the communications interface 220, such as via a vehicle data bus, I/O interface (including serial interfaces), mobile communications device, and/or a network connection as appropriate to the requirements of specific applications of embodiments. In a variety of embodiments, a vehicle telematics device is connected to a diagnostic connector (e.g. an OBD II port) in a vehicle. It should be readily appreciated by one having ordinary skill that these are merely illustrative examples and any such information can be used as appropriate to the requirements of specific applications.

Figure 2B:
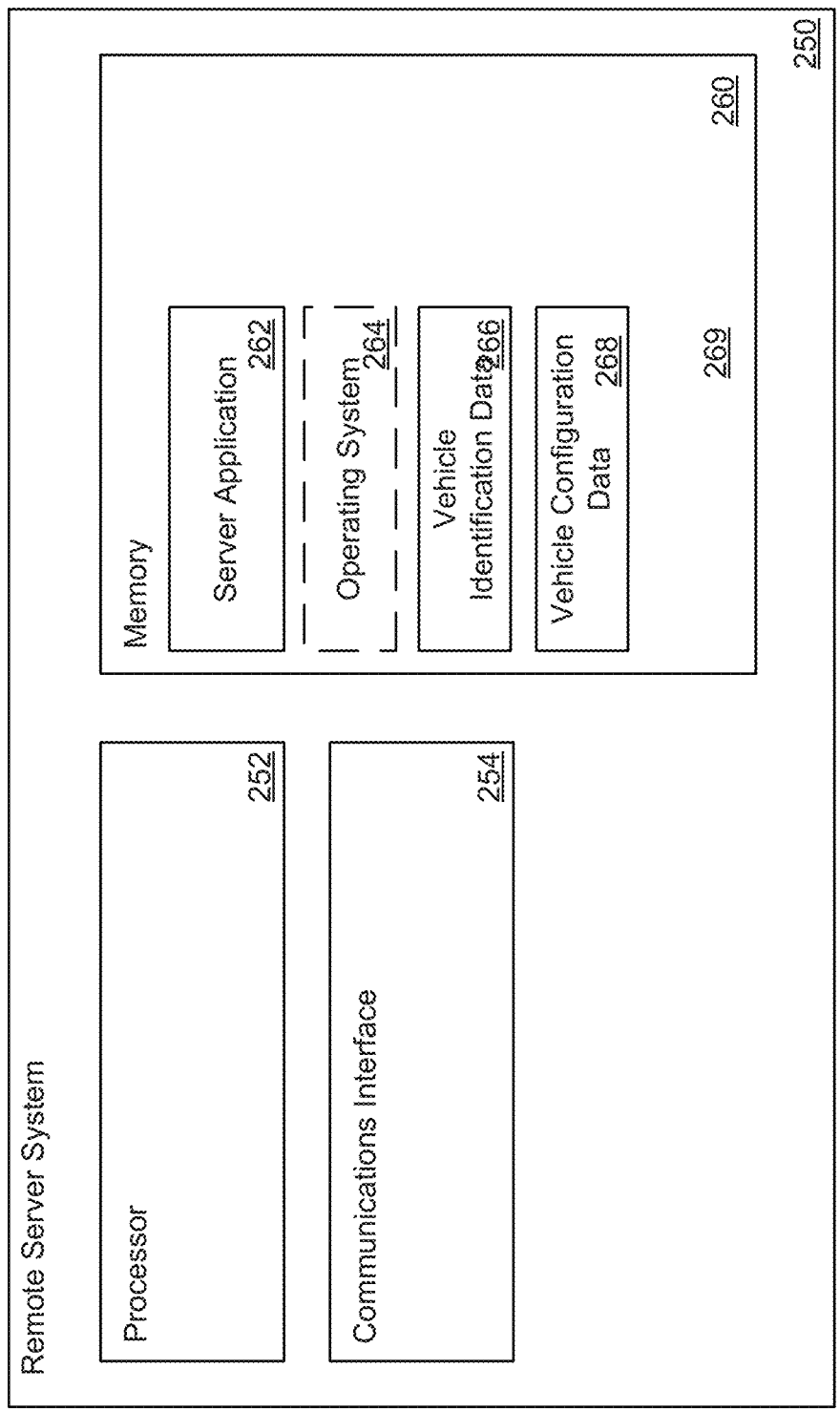
FIG. 2B is a conceptual block diagram of a remote server system, in accordance with an embodiment

FIG. 2B is a conceptual block diagram of a remote server system, in accordance with an embodiment. The remote server system 130 includes a processor 252 in communication with memory 260. The remote server system 130 can also include one or more communications interfaces 254 capable of sending and receiving, such as with a vehicle telematics device. In a number of embodiments, the communication interface is in communication with the processor 252 and/or the memory 260. In several embodiments, the memory 260 is any form of storage configured to store a variety of data, including, but not limited to, a server application 262, an operating system 264, vehicle identification data 266, vehicle configuration data 268. In many embodiments, the server application 262, an operating system 264, vehicle identification data 266, and vehicle configuration data 268 are stored by using an external server system and received by the remote server system 130 by using the remote communications interface 254.

Although specific architectures for vehicle telematics devices and remote server systems in accordance with embodiments are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed by using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices. UVLO In many embodiments, a telematics device can have several different operating modes based on the power supply to the device, and a UVLO circuit can be used to set the different operating modes of the telematics device based on the power supply. In many embodiments, when a supply voltage is below a UVLO threshold, the UVLO circuit can switch the telematics device to an off state, whereby the internal components, except the UVLO circuit, can be disabled. In many embodiments, the input supply current when the device is off can typically be very small.

In many embodiments, when a supply voltage is above a maximum UVLO threshold, but below a recommended minimum operating voltage, a UVLO circuit can enable a set of device functions, but full performance (e.g., all device functions) may not be specified.

In many embodiments, full performance (e.g., all device functions) can be specified when the supply voltage lies within a recommended operating condition for the telematics device. Accordingly, the UVLO circuit can set different thresholds for different operating conditions of the telematics device, including an off-state threshold where no device operations are enabled, a maximum UVLO threshold where a subset of device operations are enables, and a recommended operating range threshold where all device functions are enabled.

UVLO circuits in accordance with many embodiments of the invention can be designed to include hysteresis control. Hysteresis can occur when a device powers on, whereby an initial current draw from the device can cause the supply voltage to drop below a threshold. Without hysteresis, that voltage drop could immediately turn the device off again. Accordingly, many embodiments provide for hysteresis control to prevent a device from turning off in such situations.

Figure 3:
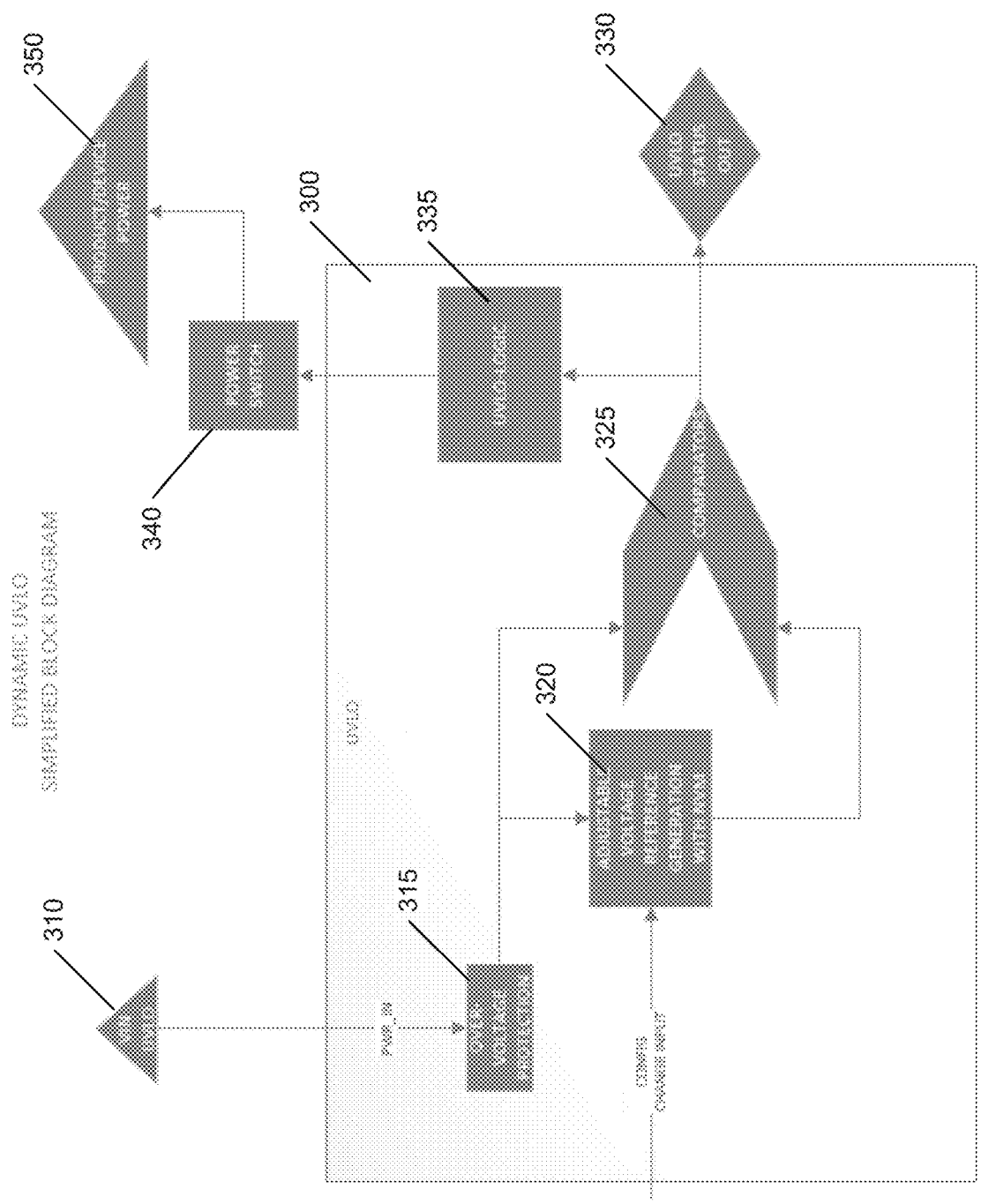
FIG. 3 illustrates a UVLO circuit in accordance with an embodiment of the invention.

A dynamic UVLO circuit with automatic threshold configuration in accordance with an embodiment of the invention is illustrates in FIG. 3. In particular, the UVLO circuit 300 receives power from VIN UVLO 310 and provides it to an over-voltage protection circuit 315. The over-voltage protection circuit 315 compares the supplied power with one or more threshold values using comparator 325 in order to determine characteristics of the power supply. The threshold value for the over-voltage protection circuit 315 can be determined using adjustable voltage reference generation with nvm 320, which can be configured based on field measurements. If the supply voltage is above the threshold, the UVLO status out 330 provides a status of the UVLO and the UVLO-logic 335 keeps the power switch 340 enabled to provide continuing power to the device 350. If the supply voltage is below the threshold, the UVLO-Logic 335 can disable the power switch 340 to switch off power to the device 350. The UVO-Logic can specify the different thresholds that can be used based on different power systems (e.g., 12V threshold for 12V system, 24V threshold for 24V system, among various other thresholds). In many embodiments, the UVO-Logic may also sense the current power being drawn from the power system to compare with the relevant thresholds in order to determine the characteristics of the power system (e.g., 12V vs. 24V system, among many others).

Although FIG. 3 illustrates a particular UVLO circuit that includes a particular set of components including an overvoltage protection circuit and UVO-Logic, any of a variety of components and circuit designs may be utilized as appropriate to the requirements of specific applications in accordance with embodiments of the invention.

Figure 4:
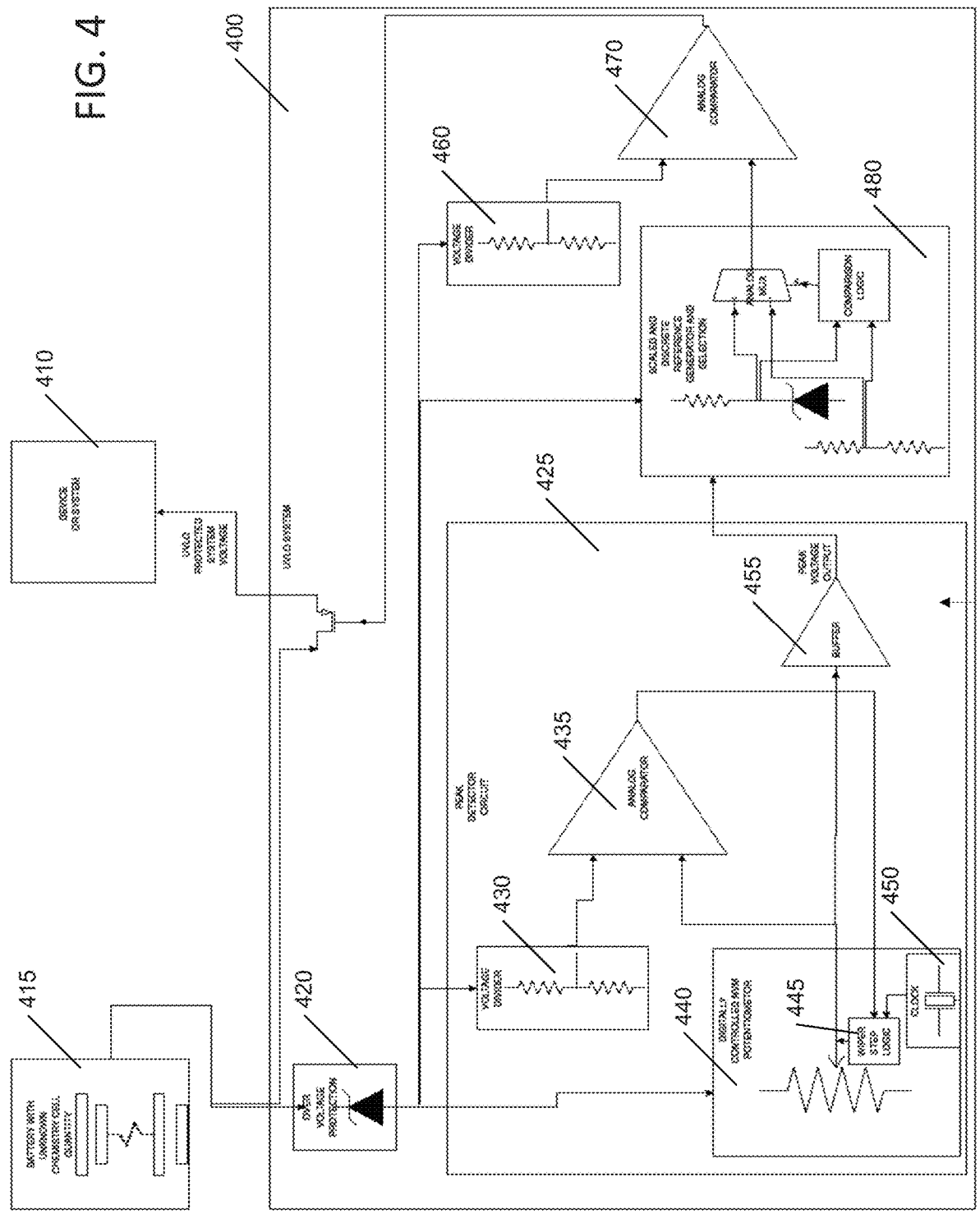
FIG. 4 illustrates a UVLO circuit with configurable UVLO threshold in accordance with an embodiment of the invention.

FIG. 4 illustrates a UVLO circuit with configurable UVLO threshold in accordance with an embodiment of the invention. The UVLO circuit 400 may include an over voltage protection circuit 420 that receives power from an external source 415. The external source 415 can be a battery with an unknown chemistry or cell quantity. The UVLO circuit can send a UVLO protected system voltage to an external device or system 410 (e.g., telematics device).

The UVLO circuit can include a peak detector circuit 425, a scale and discrete reference generator and selection circuit 480, an analog comparator 470, and a voltage divider 460. The over voltage protection circuit 420 can protect the electronics from excess voltage, which could potentially damage or destroy electronic components. In particular, the over voltage protection circuit 420 can cutoff the supply whenever the input voltage exceeds a value. In many embodiments, a Zener Diode and/or a MOV with a fuse can be used for automatic overvoltage protection, and a Bipolar Junction transistor can be used to create a voltage regulated at a known desired value.

The peak detector circuit 425 can be used to measure a peak value of a signal from the power system. In many embodiments, the peak detector circuit 425 can be used to sense the power supply of a power system of a vehicle. The peak detector circuit 425 can include a voltage divider 430, an analog comparator 435, a digitally controlled NVM potentiometer 440 that includes a wiper step logic 445 and clock 450, and a buffer 455. The voltage divider 430 can produce an output voltage ($V_{out}$) that is a fraction of its input voltage ($V_{in}$). The digitally-controlled potentiometer is an electronic potentiometer whose wiper position can be digitally controlled. The peak detector circuit 425 can use an analog comparator 435 and a buffer 455 to determine a peak voltage output that is provided to a scaled and discrete reference generator and selection circuit 480. The scaled and discrete reference generator and selection circuit 480 selects a reference threshold for the UVLO circuit 400 based on the detected characteristics of the power system, included the sensed voltage output of the peak detector circuit 425, which is compared using analog comparator 470 to a power supply obtained from voltage divider 460. The result is provided as a voltage to the UVLO protected system voltage 410. In many embodiments, the peak detector circuit 425 senses a vehicle power system supply and uses that to set a threshold using the scaled and discrete reference generator and selection circuit 480. In many embodiments, the output from the peak detector can be used to identify a power system (e.g., 12V vs. 24V) and also be used to specify a UVLO threshold (e.g. 90% of 12V or 90% of 24V) based on the detected power supply. Accordingly, different thresholds can be automatically specified for different power systems as sensed by the UVLO circuit. The UVLO circuit 400 can then continue to enable a telematics device 410 or to shut down the telematics device 410 based on the supply voltage being received by the battery 415. Although FIG. 4 illustrates a particular UVLO with dynamically configurable threshold reference voltage using a peak detector circuit, any of a variety of UVLO circuit designs may be specified as appropriate to the requirements of specific applications in accordance with embodiments of the invention.

Figure 5:
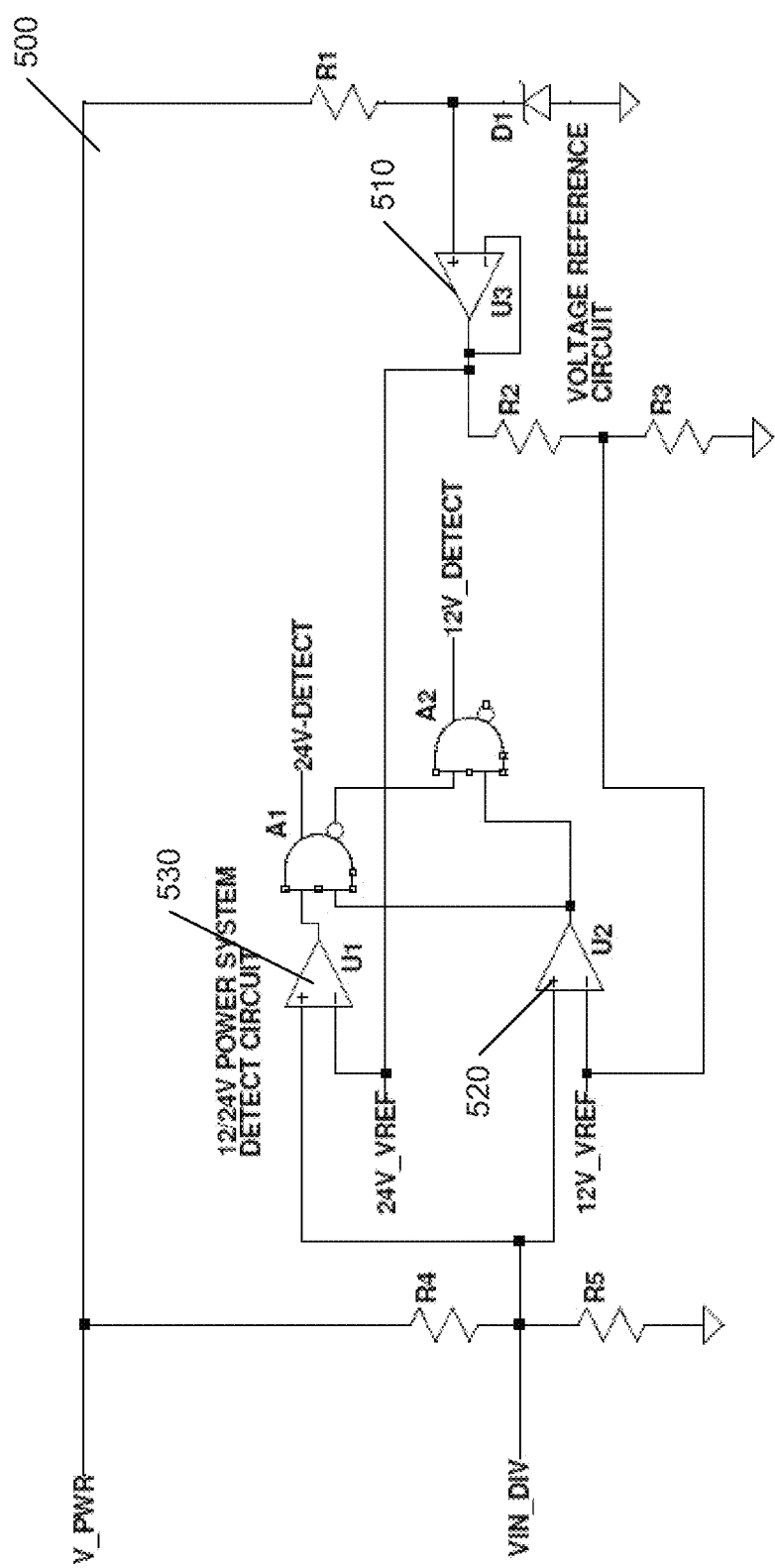
FIG. 5 illustrates a UVLO circuit that can automatically adjust a threshold for compatibility with devices that have different supply voltage properties in accordance with an embodiment of the invention.

FIG. 5 illustrates a UVLO comparator circuit architecture for a 12V and 24V reference system that can automatically adjust a threshold for compatibility with devices that have different supply voltage properties in accordance with an embodiment of the invention. In particular, the UVLO circuit 500 can include V_PWR that provides an input power from an external power source (e.g., battery). A comparator 510 can compare the power supply from V_PWR with a voltage reference circuit, using comparators 520 and 530, where each can be compared with a 24V reference threshold and a 12V reference threshold. Based on the power supply, the UVLO can select either a 24V reference threshold or a 12V reference threshold. Accordingly, the UVLO threshold can be configured for either a 24V system or a 12V system. Although FIG. 5 illustrates a particular UVLO circuit with dynamically configurable voltage reference thresholds, any of a variety of UVLO circuits, including with many different voltage thresholds (e.g., 2V, 6V, 12V, 16V, 24V, 48V, among others) can be specified as appropriate to the requirements of specific applications in accordance with embodiments of the invention.

Figure 6:
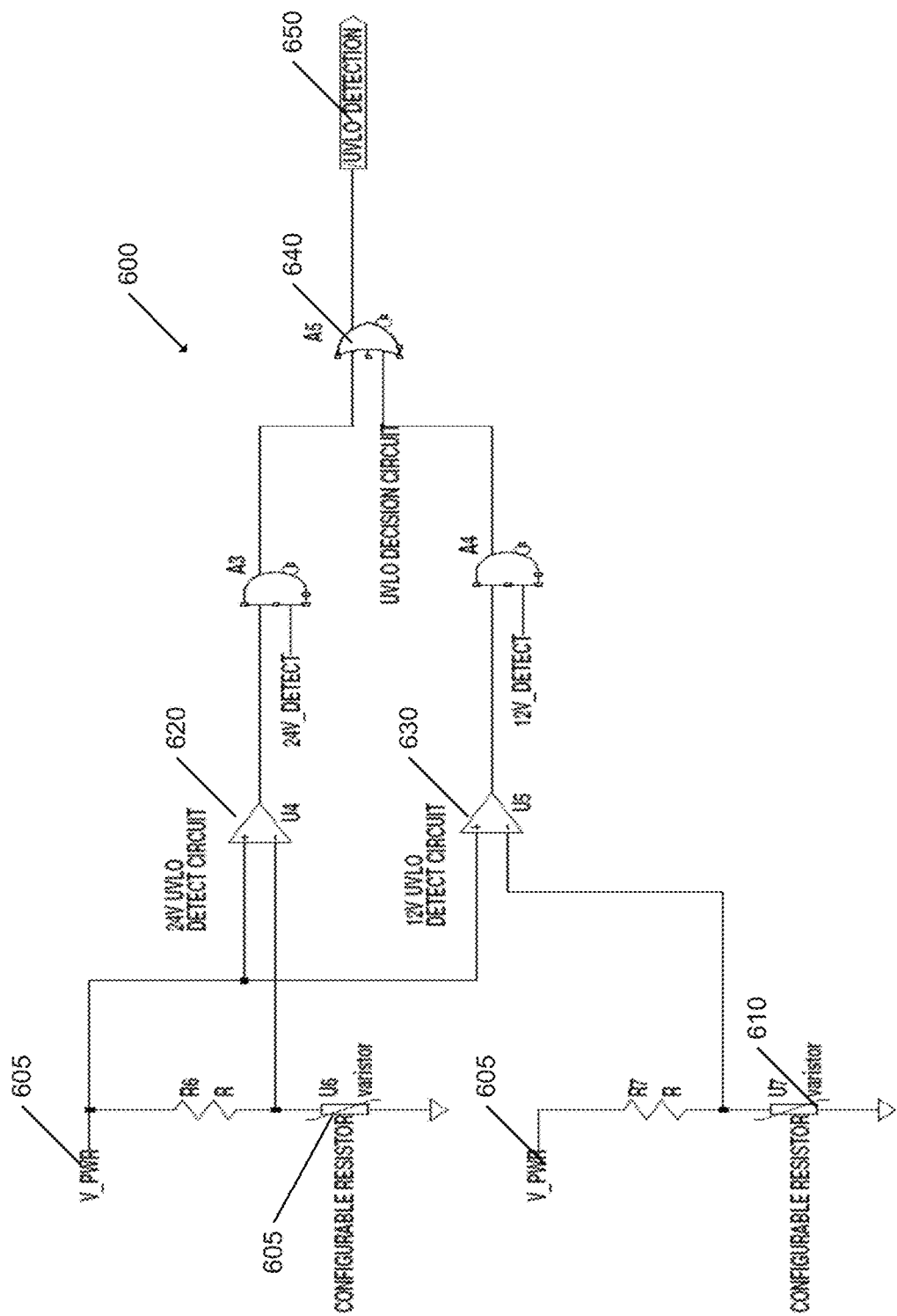
FIG. 6 illustrates a UVLO circuit with 12V and 24V dynamic threshold configuration in accordance with an embodiment of the invention

FIG. 6 illustrates a UVLO circuit with 12V and 24V dynamic threshold configuration in accordance with an embodiment of the invention. The UVLO circuit 600 includes a V_PWR 605 that provides a supply power from an external source (e.g., battery), configurable resistor 605, configurable resistor 610, a 24V UVLO detect circuit 620, a 12V UVLO detect circuit 630, and UVLO decision circuit 640. The 24V UVLO Detect Circuit 620 can use a comparator to compare the supply power from V_PWR 605 with a 24V threshold, and using Boolean logic, AND the result with a 24V threshold. The comparator can compare the two voltages or currents and outputs a digital signal indicating which is larger.

The 12V UVLO Detect Circuit 630 can use a comparator to compare the V_PWR 605 with a 12V threshold, and use a Boolean "AND" operation on the result with a 12V threshold. The UVLO decision circuit can select the Boolean "OR" of the results as the UVLO detection 650 threshold. For example, on a 24V system, the UVLO may configure a 24V detection threshold, whereas on a 12V system, the UVLO may configure a 12V detection threshold. Although FIG. 6 illustrates a particular UVLO circuit design with 12V and 24V threshold configurations, any of a variety of circuit designs can be utilized as appropriate to the requirements of specific applications in accordance with embodiments of the invention.

Figure 7:
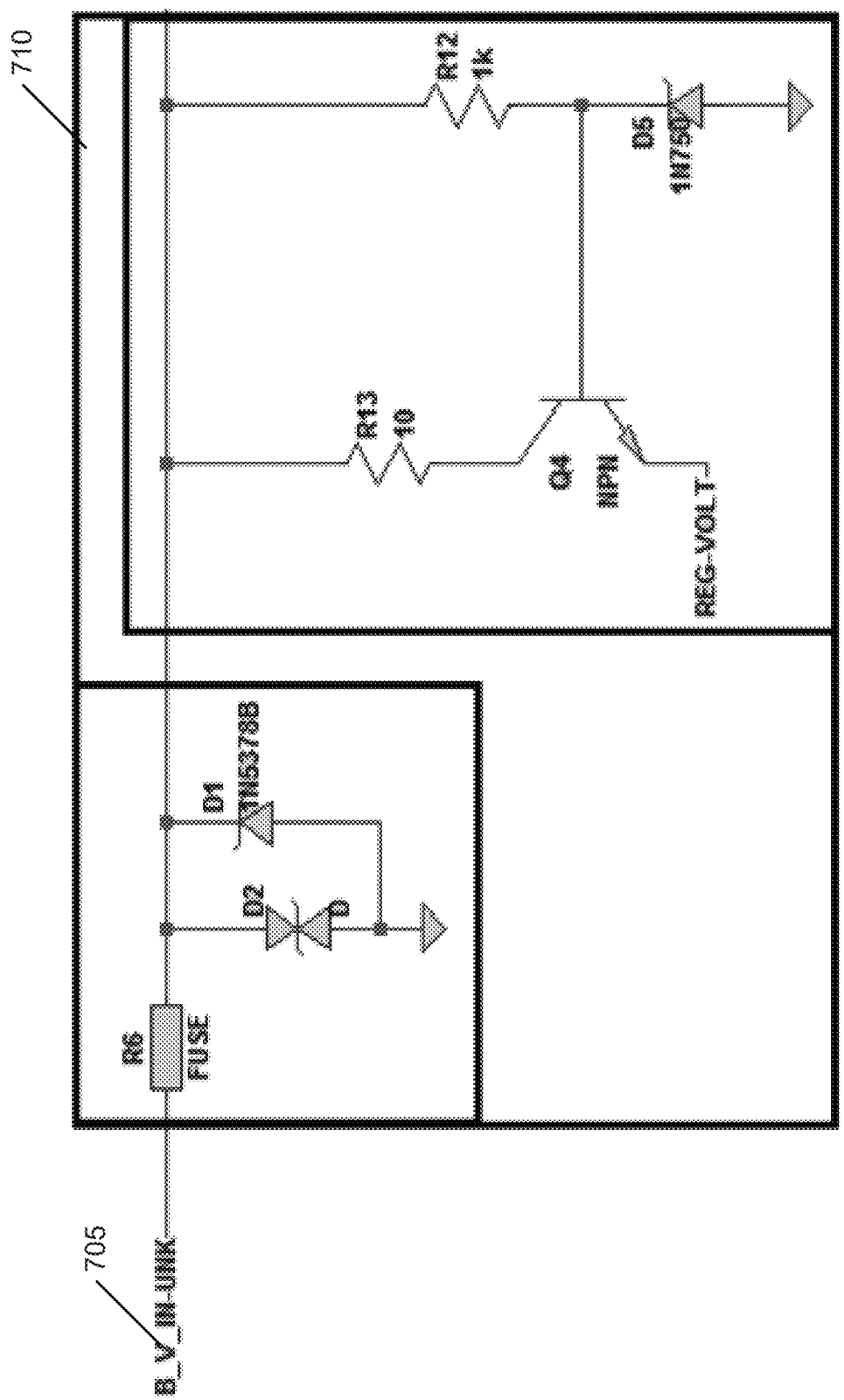
FIG. 7 illustrates an over voltage protection and regulator circuit that can be utilized within a UVLO circuit in accordance with an embodiment of the invention.

An over voltage protection and regulator circuit that can be utilized within a UVLO circuit in accordance with an embodiment of the invention is illustrated in FIG. 7. In particular, FIG. 7 illustrate an over voltage protection and regulator circuit 710 being supplied by "B_V_IN-UNK" voltage 705, which may represent an unknown voltage supplied by an external source. In many embodiments, the external source 705 can be a battery with an unknown chemistry (e.g., NiMH, LiPO, Lead Acid, among other), and unknown series cell quantity. The over voltage protection and regulator circuit 700 can include a Zener Diode, fuse, and TVS diode or MOV for automatic overvoltage protection, and a Bipolar Junction Transistor with another Zener Diode for voltage regulation. Although FIG. 7 illustrates a particular circuit architecture for an over voltage protection and regulator circuit, any of a variety of circuit designs may be utilized as appropriate to the requirements of specific applications in accordance with embodiments of the invention.

Figure 8:
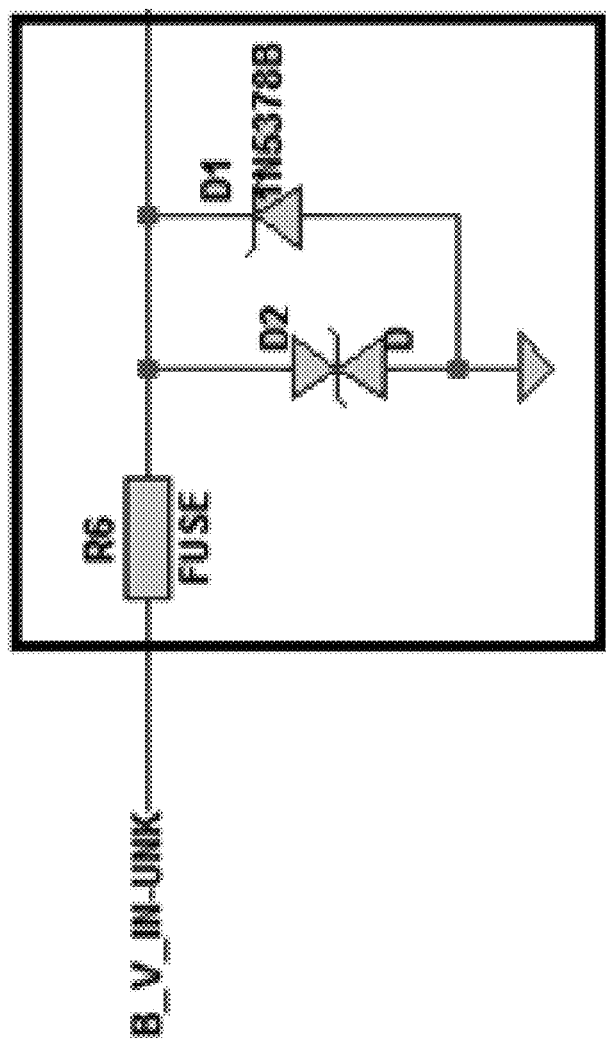
FIG. 8 illustrates a configuration for over voltage protection circuit in accordance with an embodiment of the invention

FIG. 8 illustrates a configuration for over voltage protection circuit in accordance with an embodiment of the invention. A fuse and metal-oxide varistor (MOV) and/or a correctly sized Zener and/or clamping diode can cause an open circuit (at the fuse), when the voltage across the Zener exceeds a reverse avalanche voltage. Although FIG. 8 illustrates a particular configuration for an over voltage protection circuit, any of a variety of circuit designs may be utilized as appropriate to the requirements of specific applications in accordance with embodiments of the invention. In some embodiments, an over voltage protection circuit may not be necessary as part of the UVLO device (e.g., in consumer products using small battery's such as AA, AAA, C, D or other low voltage batteries).

Figure 9:
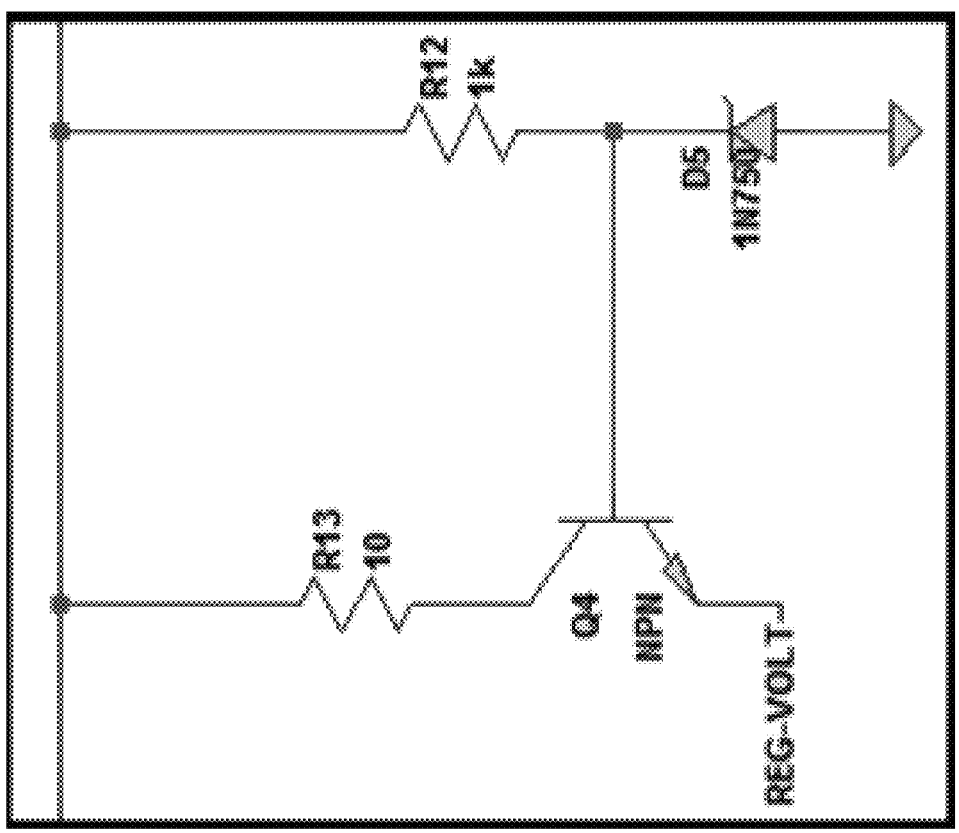
FIG. 9 illustrates a configuration for creating a low current sourcing voltage regulator in accordance with an embodiment of the invention

FIG. 9 illustrates a configuration for creating a low current sourcing voltage regulator in accordance with an embodiment of the invention. In many embodiments, REG-VOLT may be ~0.7V less than the Zener voltage of D5, due to the Vbe of Q4 causing a diode drop. Although FIG. 9 illustrates a particular configuration for creating a low current sourcing voltage regulator, any of a variety of circuit designs may be utilized as appropriate to the requirements of specific applications in accordance with embodiments of the invention. In several embodiments, a switching regulator may be utilized, including a buck, boost, or a buck-boost depending on the scale at which the desired battery voltage should extend.

Figure 10:
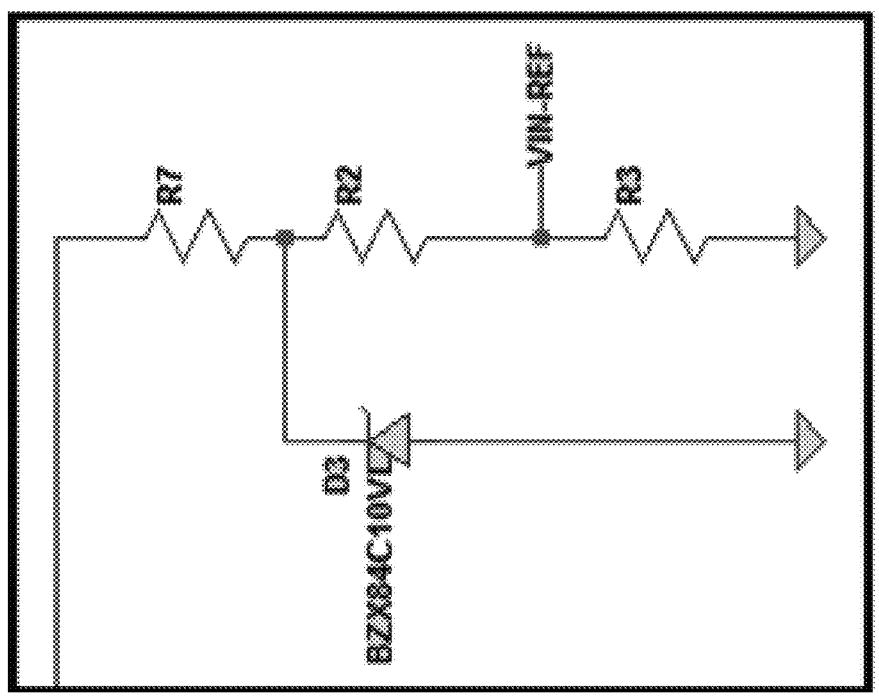
FIG. 10 illustrates a circuit architecture for providing a reference voltage proportional to the protected battery supply voltage in accordance with an embodiment of the invention.

FIG. 10 illustrates a circuit architecture for providing a reference voltage proportional to the protected battery supply voltage in accordance with an embodiment of the invention. In many embodiments, the values may be sizes such that R7, and R2 form a voltage divider with R3 with the desired divider ratio of the battery voltage to VIN-REF and that D3 prevents VIN-REF from exceeding REG-VOLT at any voltage level not protected by the over voltage protection circuitry. Although FIG. 10 illustrates circuitry for providing a reference voltage proportional to a protected battery supply voltage, any of a variety of circuit designs may be utilized as appropriate to the requirements of specific applications in accordance with embodiments of the invention.

Figure 11:
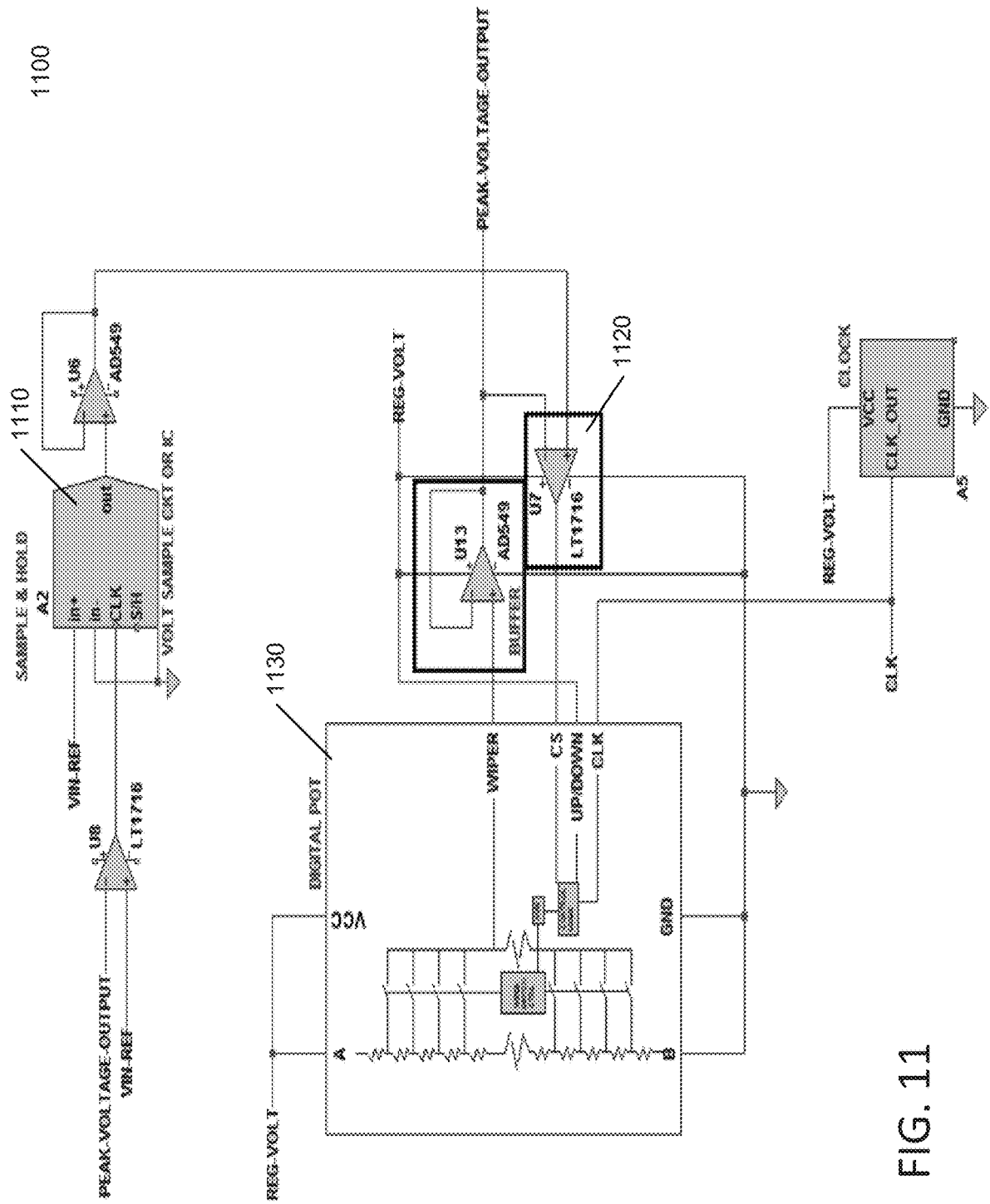
FIG. 11 illustrates a configuration of a peak detecting circuit in accordance with an embodiment of the invention.

A configuration of a peak detecting circuit in accordance with an embodiment of the invention is illustrated in FIG. 11. As illustrated, the input voltage may be sampled with the sample and hold circuit 1110 any time the voltage set as the peak is less than the voltage from the scaled battery voltage. Once the sample has taken place, U7 circuit 1120 may determine if the new sampled voltage is higher than what is configured as the peak voltage. If it is higher, the digital pot 1130 can be incremented until the voltages are equal, and remains there as long as the sampled voltage doesn't increase. Although FIG. 11 illustrates a particular configuration of a peak detecting circuit, any of a variety of configurations and circuit designs can be utilized as appropriate to the requirements of specific applications in accordance with embodiments of the invention.

Figure 12:
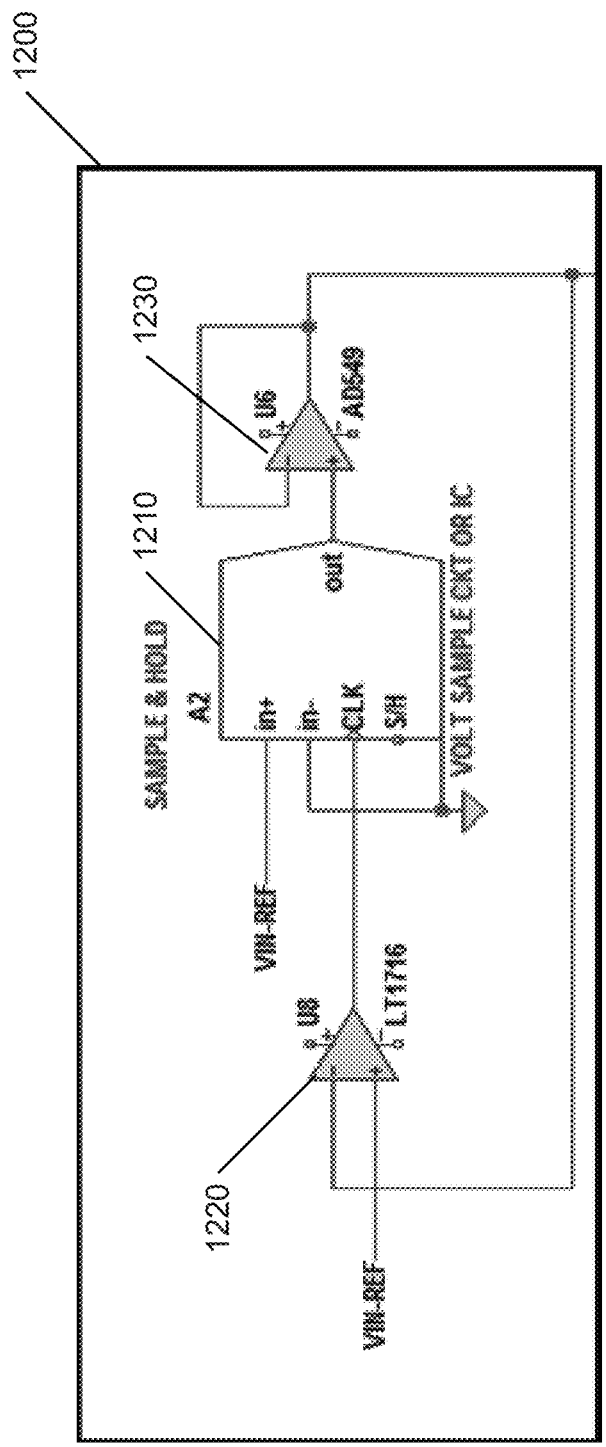
FIG. 12 illustrates a sample and hold circuit in accordance with an embodiment of the invention.

A sample and hold circuit in accordance with an embodiment of the invention is illustrated in FIG. 12. The sample and hold circuit 1200 can include comparator 1220, comparator 1230, and sample and hold circuit 1210. The sample and hold circuit 1210 can sample a voltage and hold its value at a constant level for a specified time period. Although FIG. 12 illustrates a particular sample and hold circuit, any of a variety of circuit designs may be utilized as appropriate to the requirements of specific applications in accordance with embodiments of the invention. In some embodiments, the sample & hold circuit may be undesirable or unnecessary. For example, in a system in which the battery is getting a charge, depending on the charge methodology, the voltage may take on noise, or voltage spikes under charge. In many embodiments, the noise can be filtered out of the peak-detection sampling as it can artificially indicate a false high voltage.

Figure 13:
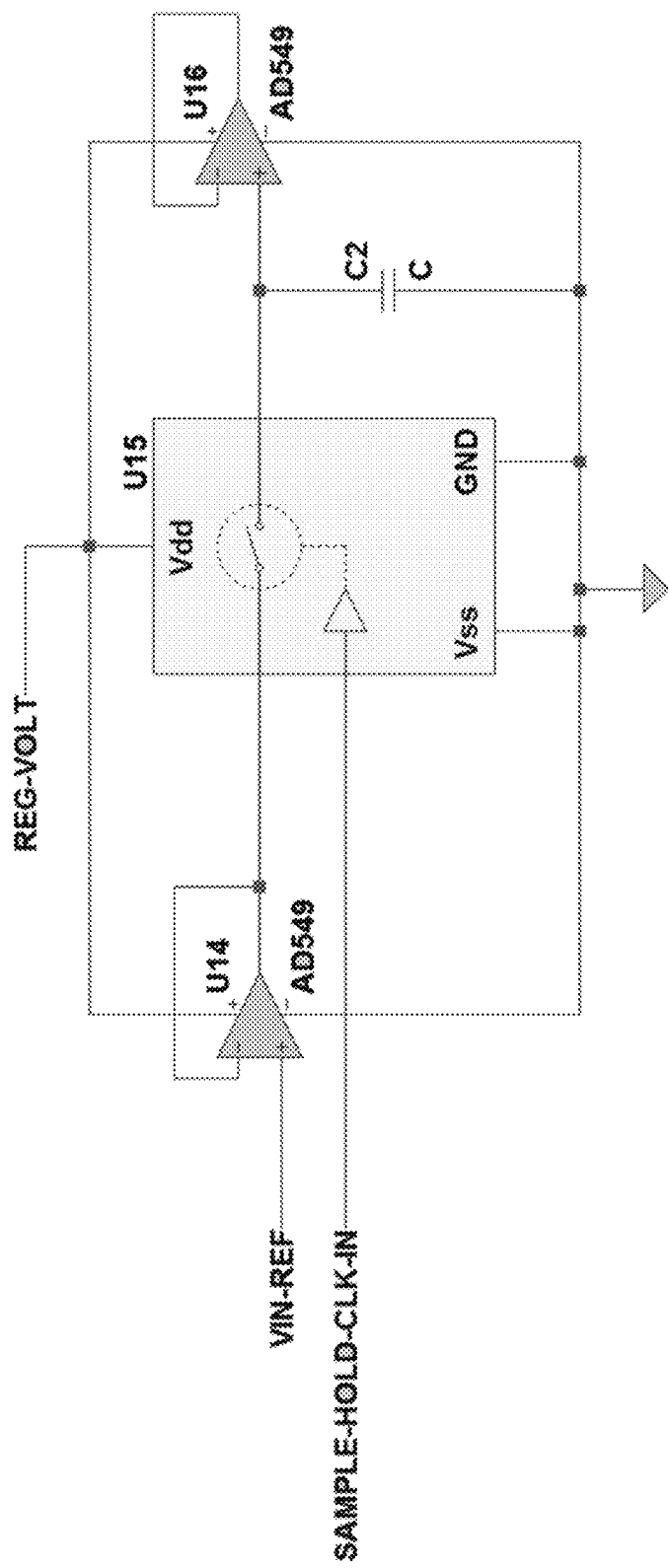
FIG. 13 illustrates a sample and hold circuit using a high impedance input and low impedance output circuit in accordance with an embodiment of the invention.

FIG. 13 illustrates a sample and hold circuit using a high impedance input and low impedance output circuit in accordance with an embodiment of the invention. The circuit can be used to sample the voltage while drawing very low current, and charges the capacitor C2 to the "sampled voltage" level when the control switch is activated (U15) from the "SAMPLE-HOLD-CLK-IN" signal. To minimize discharge from the capacitor after the sample, U16 can be used to once again buffer the voltage. In many embodiments, the sample and hold circuit can be used to detect even the fastest voltage spikes in the event that the voltage rises faster than the clock can adjust the digital potentiometer to reach. Although FIG. 13 illustrates a particular sample and hold circuit, any of a variety of circuit designs may be utilized as appropriate to the requirements of specific applications in accordance with embodiments of the invention.

Figure 14:
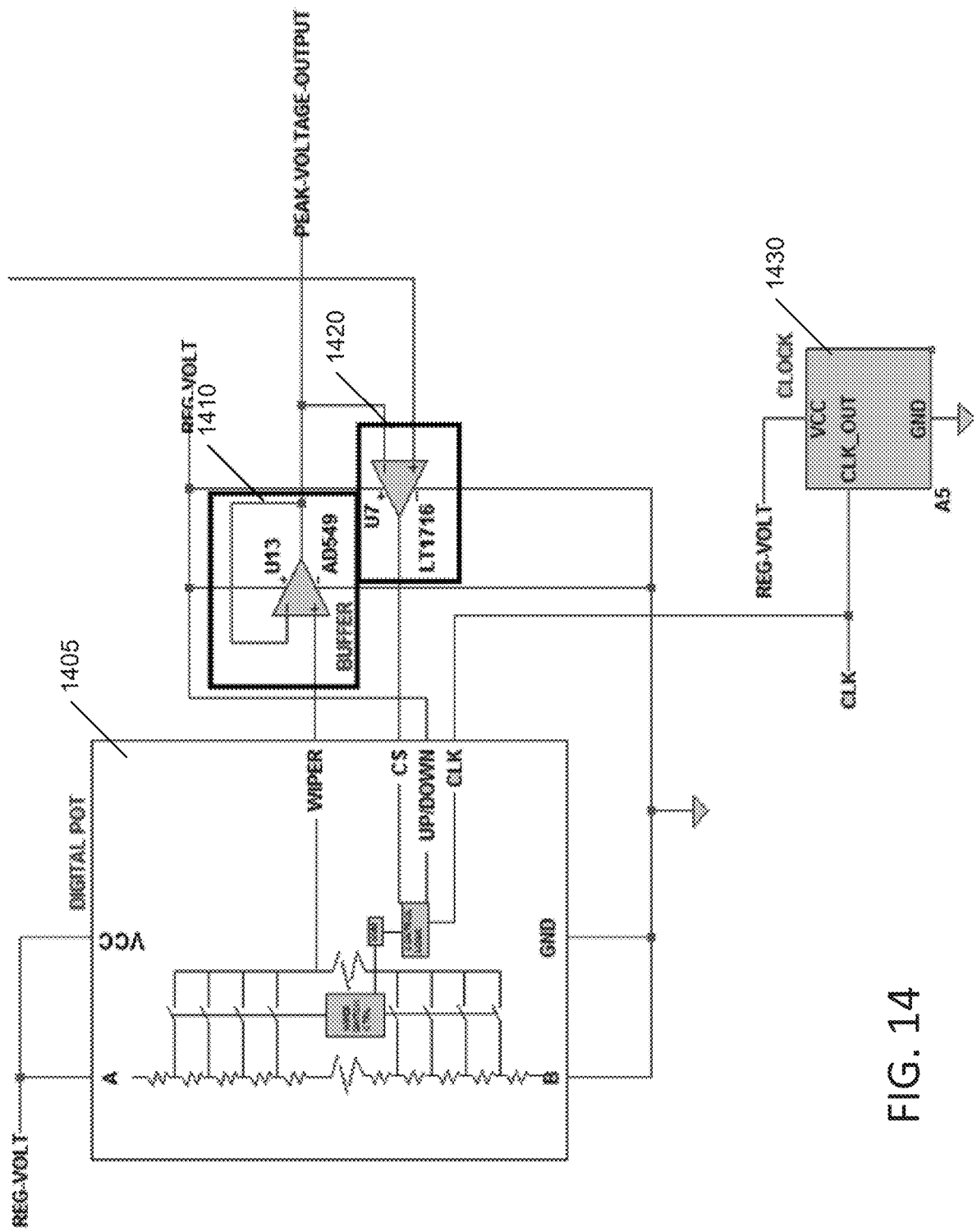
FIG. 14 illustrates a circuit for use to measure and hold a peak voltage value in accordance with an embodiment of the invention.

FIG. 14 illustrates a circuit for use to measure and hold a peak voltage value. The circuit 1400 includes a digital pot 1405, a buffer circuit 1410, a comparator 1420, and a clock 1430. If the clock 1430 is at a high enough frequency, the "sample & hold" circuit may be unnecessary.

The digital pot 1405 can include a ladder of static resistor values in series with a tap between each one connected to switches which is connected to the "WIPER". Depending on which switch is closed can determine the value of the resistance above and below the WIPER pin, thus forming a voltage divider. The switches can be controlled by digital logic which can be determined by three signals. The signals can be CS, UP/DOWN, and CLK. The UP/DOWN pin can determine the direction of change to the switches, if high, the switch can goes up, and if low, the switch can go down. In many embodiments, this can be tied to logic high so that at each clock rising edge the switches increment by one. The CS input is an enable, whereby if low, it ignores the other signals. In many embodiments, as soon as U7 1420 detects that a PEAK-VOLTAGE-OUTPUT is higher than or equal to a measured value, it turns of the CS pin therefore holding the potentiometer at is current value. In this way the circuit can track the highest voltage measured from the input.

Although FIG. 14 illustrates a particular circuit for measuring and holding a peak voltage value, any of a variety of circuit designs may be utilized as appropriate to the requirements of specific applications in accordance with embodiments of the invention.

Figure 15:
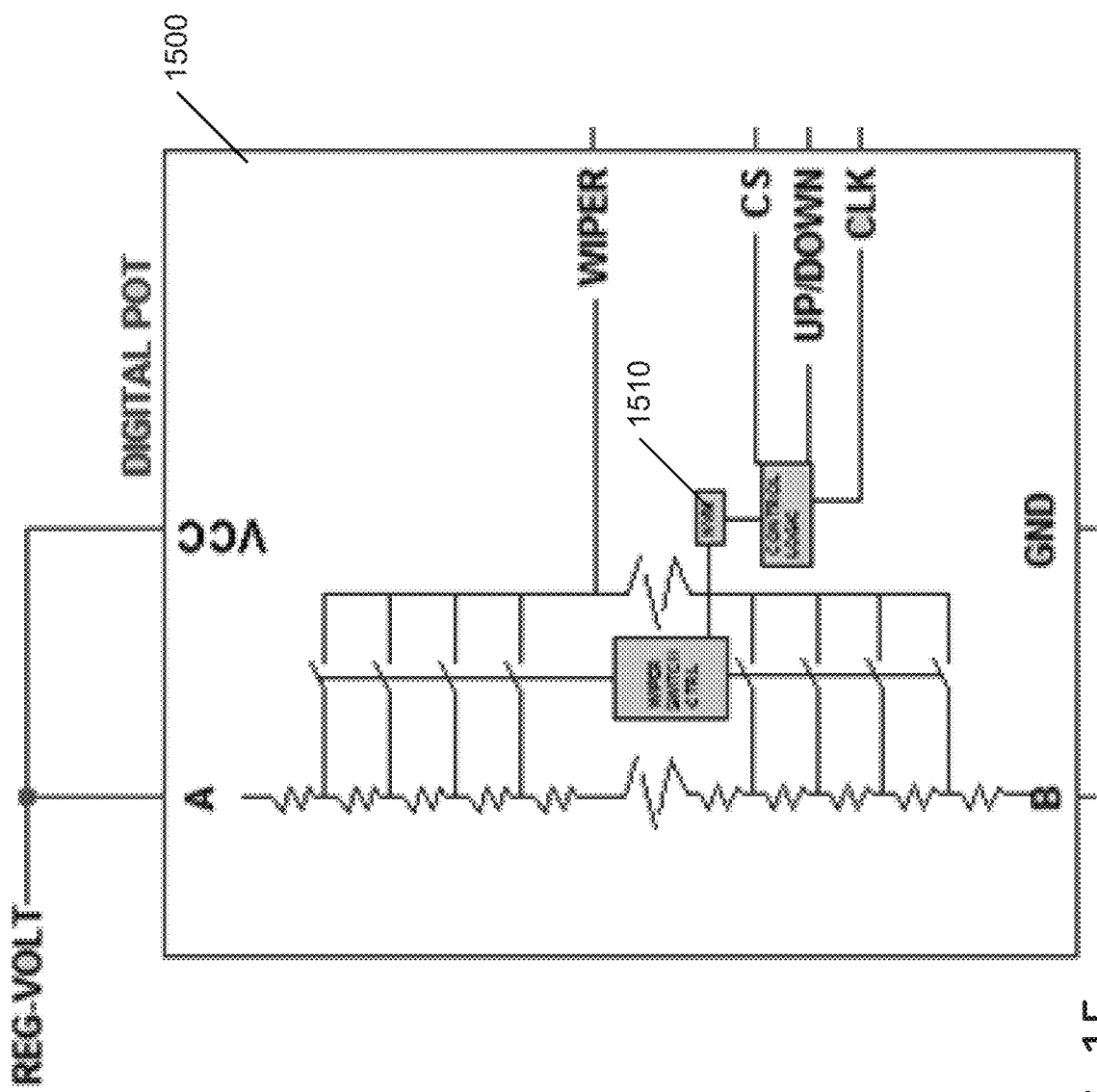
FIG. 15 illustrates a close up of a digital pot in accordance with an embodiment of the invention.

FIG. 15 illustrates a close up of a digital pot in accordance with an embodiment of the invention. In many embodiments, the CS can enable the chip when its logic level high. In many embodiments, the CLK signal can move the switch configuration one spot in the direction determined by the UP/DOWN pin.

The digital pot 1500 can include a non-volatile-memory (NVM) built into the digital pots circuit. The NVM 1510 may allow the peak detector to remember the highest peak voltage even after complete power down. In certain embodiments, this may be desirable to know as once a unit is installed, the power supply will be provided from the same battery. In certain embodiments, removing the NVM may be preferred so that the circuit looks for a new peak voltage at every power up. This may be beneficial if the device may use numerous batteries for power throughout its life. Although FIG. 15 illustrates a particular digital pot circuit design that includes an NVM, any of a variety of digital pot circuit designs may be utilized, including those that do not include an NVM, as appropriate to the requirements of specific applications in accordance with embodiments of the invention.

Figure 16:
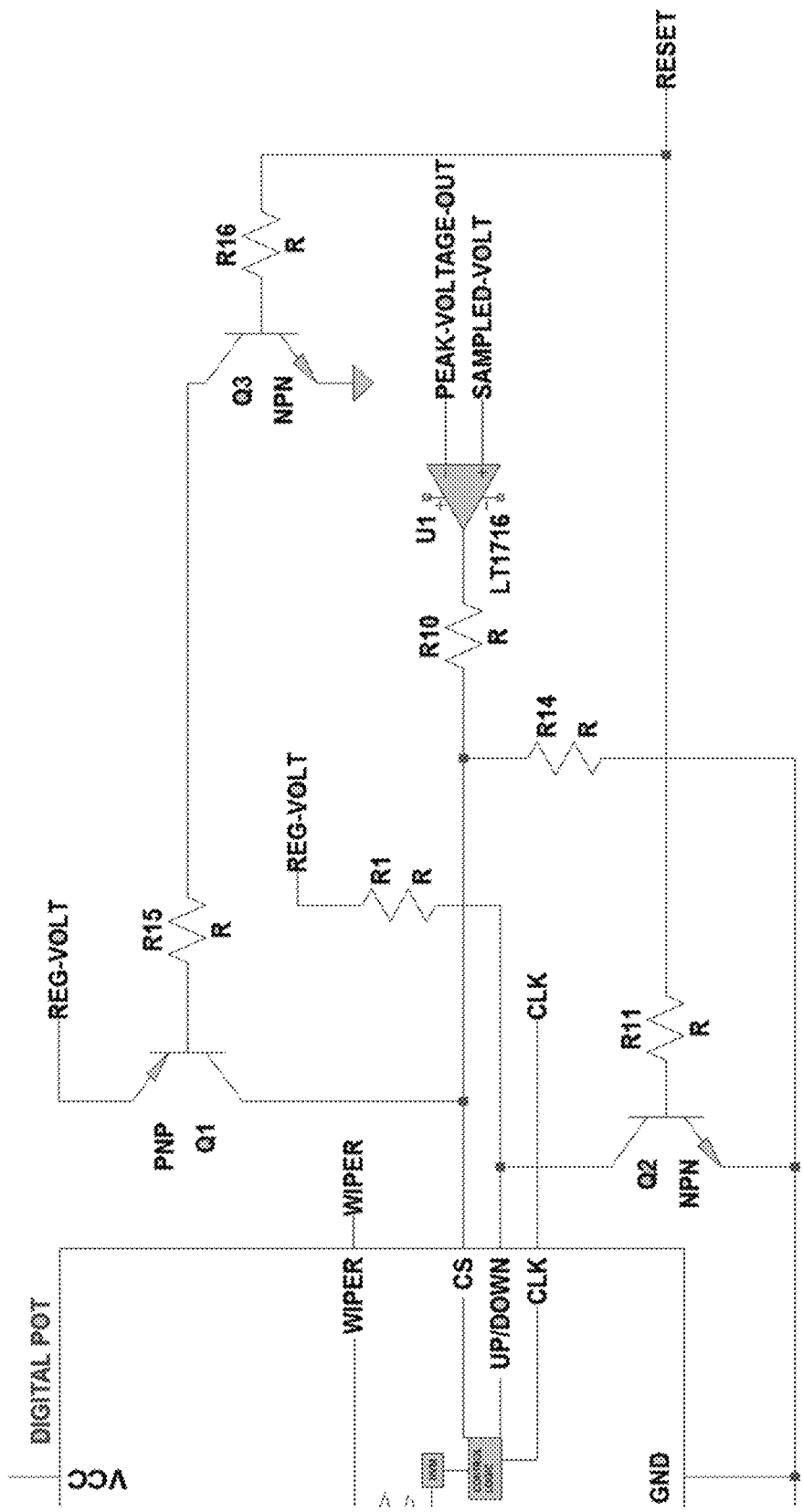
FIG. 16 illustrates a peak detector circuit that includes the ability to reset a configured peak voltage in accordance with an embodiment of the invention.

A peak detector circuit that includes the ability to reset a configured peak voltage in accordance with an embodiment of the invention is illustrated in FIG. 16. The configuration 1600 for a peak detector circuit may be desirable if there may be changes to battery types without a need to power down the device. Although FIG. 16 illustrates a particular peak detector circuit that includes the ability to reset a configured peak voltage, any of a variety of peak detector circuits may be utilized as appropriate to the requirements of specific applications in accordance with embodiments of the invention.

Figure 17:
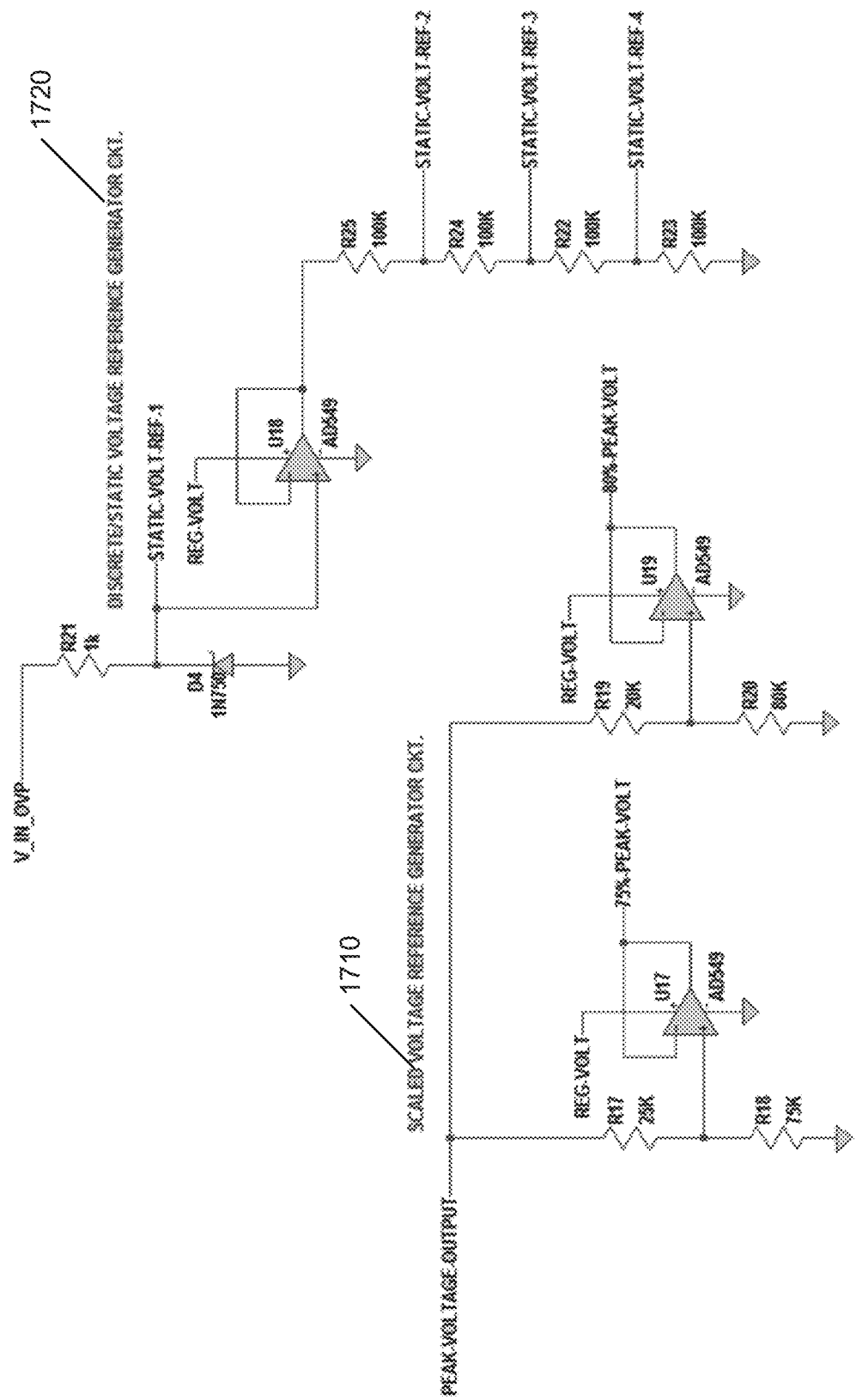
FIG. 17 illustrates a UVLO threshold voltage reference configuration in accordance with an embodiment of the invention.

A UVLO threshold voltage reference configuration in accordance with an embodiment of the invention is illustrated in FIG. 17. The Scaled voltage reference generator circuit 1710 may provide a voltage reference that is proportional to a peak voltage that is measured. In many embodiments, there is no limit to what percentages can be used. This may allow the circuit to set a threshold at some percentage of the peak voltage, as such to setting a UVLO threshold to some percent of a battery's capacity. For example, in a lead-acid battery system, with a peak voltage measurement of 13V (indicating that it is likely a single vehicle battery system), the cutoff voltage can be set to 75% of that voltage, which would stop power at 9.75V which is likely where the battery is very close to being dead. This prevents further drain on the battery and extends it life.

In many embodiments, the UVLO may use several proportional voltage references to make a hysteresis window. As illustrated in FIG. 17, the UVLO may be set to shut off power at a particular percentage of the peak threshold (e.g., 75% as illustrated), and then kept off until the battery is charged to a higher threshold (e.g., 80%), whereby as soon as the voltage reaches the peak threshold of 75%, even voltage bounce back from load removal may not turn the UVLO off. As illustrated in FIG. 17, the scaled voltage reference generator circuit 1710 can include several comparators that compare threshold values at different percentage peak thresholds (e.g., 75% and 80% of the peak voltage). Accordingly, different percentages can be specified for any of a number of different thresholds as appropriate to the requirements of specific applications in accordance with embodiments of the invention.

In many embodiments, a discrete or static voltage reference generator circuit 1720 may be used to set several static thresholds for a peak voltage. The static voltage reference generator circuit 1720 illustrated in FIG. 17 in accordance with an embodiment of the invention can use a Zener diode to create a constant known voltage, and uniformly divide that down for up to a number of battery cells (e.g., 4 battery cells) in a series configuration. This can allow the UVLO the ability to use several (e.g., as illustrated a threshold of 4) predefined values depending on if the peak voltage indicated one, two, three or 4 battery cells. In particular, FIG. 17 illustrates that discrete/static voltage reference generator circuit 1720 includes a static-volt-ref-1, static-volt-ref-2, static-volt-ref-3, and static-volt-ref-4, connected in series with a resistor between each threshold. The circuit 1720 can also include a comparator that compares the thresholds with a power input drawn from the external power source.

Different embodiments may specify different thresholds and/or values for the thresholds as appropriate to the requirements of specific applications in accordance with embodiments of the invention. As illustrated in FIG. 17, Although FIG. 17 illustrates a UVLO threshold voltage reference configuration for a set of thresholds, any of a variety of UVLO threshold configurations may be utilized as appropriate to the requirements of specific applications in accordance with embodiments of the invention.

Figure 18:
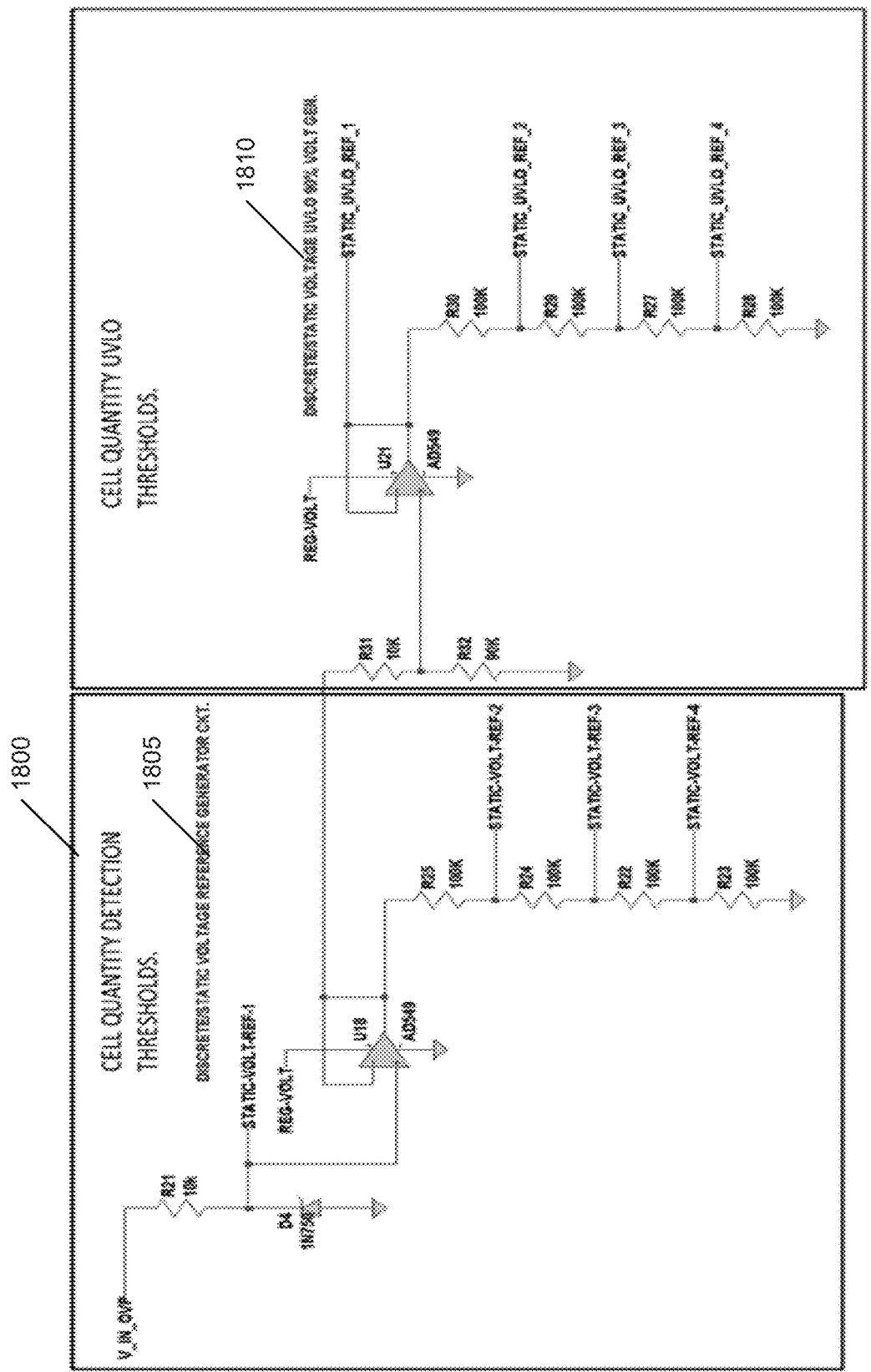
FIG. 18 illustrates a UVLO discrete reference generation circuit in accordance with an embodiment of the invention.

A UVLO discrete reference generation circuit in accordance with an embodiment of the invention is illustrated in FIG. 18. The circuit 1800 may include voltage thresholds for cell quantity detection, as illustrated by discrete/static voltage reference circuit 1805, as well as corresponding cell quantity UVLO thresholds with the thresholds at a percentage, as illustrated by discrete/static voltage UVLO 90% Volt Gen circuit 1810 (e.g., where the percentage is set at 90%) of the detected thresholds. This can provide a mechanism to determine how many cells the battery has and then to use that detection to choose a UVLO at a certain percentage (e.g., 90%) of that battery detection level. In particular, the discrete/static voltage reference generator circuit 1805 can include several different static voltage thresholds, including static-volt-ref-1, static-volt-ref-2, static-volt-ref-3, static-volt-ref-4, that can be used to determine the number of cells that a battery has and to use that detection to choose a UVLO at a particular percentage (e.g., 90%) of that battery detection level. Although FIG. 18 illustrates a UVLO discrete reference generation circuit, any of a variety of UVLO discrete reference generation circuits may be utilized as appropriate to the requirements of specific applications in accordance with embodiments of the invention.

Figure 19:
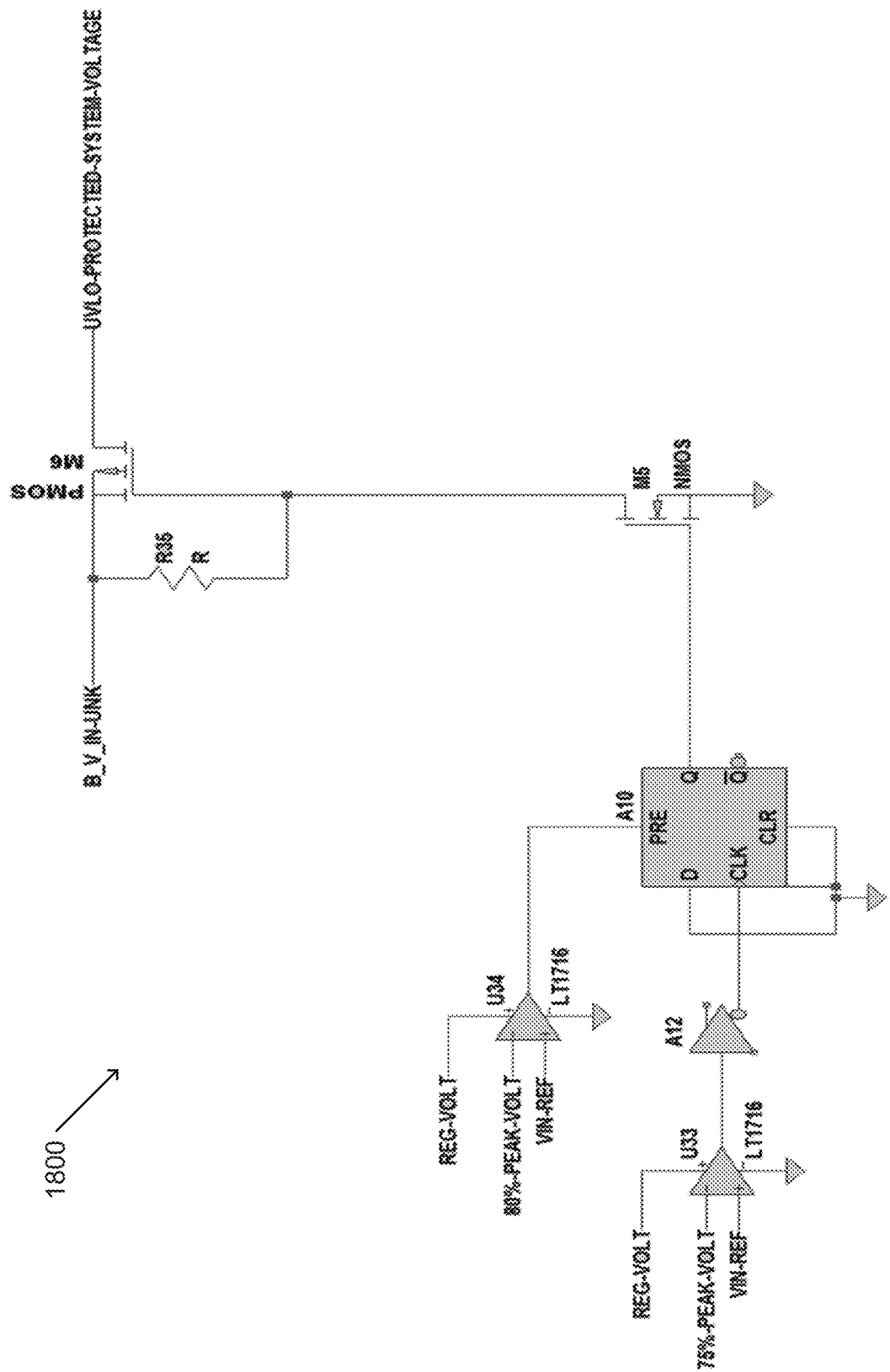
FIG. 19 illustrates comparison logic circuitry for implementing a UVLO comparison logic in accordance with an embodiment of the invention.

FIG. 19 illustrates comparison logic circuitry for implementing a UVLO comparison logic in accordance with an embodiment of the invention. The comparison logic can form a threshold voltage hysteresis which may be desirable if the battery is getting close to is cutoff voltage, and unpredictable current spikes can cause the UVLO to get triggered and released after load removal. In particular, the comparison logic circuitry 1900 can include several comparators, each with a percentage (as illustrated 75% and 80%) of a peak voltage to form a threshold voltage hysteresis. Although FIG. 19 illustrates comparison logic circuitry for implementing a UVLO comparison logic, any of a variety of circuit architectures can be utilized as appropriate to the requirements of specific applications in accordance with embodiments of the invention.

Figure 20:
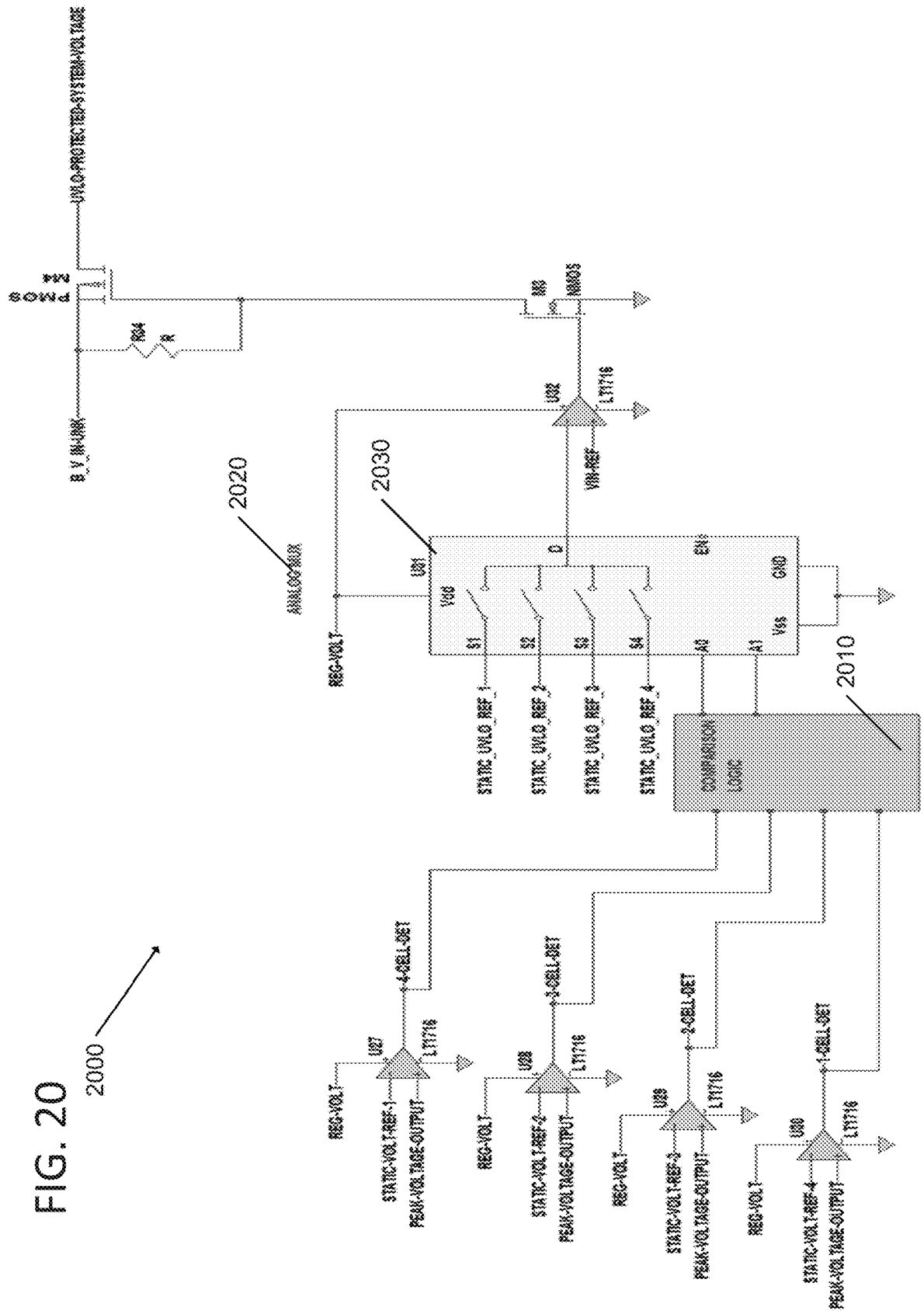
FIG. 20 illustrates circuitry for comparison logic that can be used to set various UVLO thresholds based off a "learned" peak voltage and to automatically choose a voltage level for different batteries in accordance with an embodiment of the invention.

FIG. 20 illustrates comparison logic circuitry that can be used to set various UVLO thresholds based off a "learned" peak voltage and to automatically choose a voltage level for different batteries in accordance with an embodiment of the invention. As illustrated, the comparison logic circuitry 2020 can include several comparators, illustrated as U27, U28, U29, and U30, that use as inputs a "peak-voltage-output" and a "static-volt-ref", which can be sent to comparison logic 2410. The circuit 2000 may use several, (e.g., 4 or as many as desired as appropriate to the requirements of specific applications) predefined voltage references to compare a peak detected voltage against to determine what battery type is most likely the power source. For example, if an electronic device can use a single AA battery, or alternatively, two three or four AA batteries in series for different use cases, the nominal supply voltage can be 1.5V for a single AA, 3.0V, 4.5V or 6V for two AA's, three AA's, or four AA batteries in series, respectively. In many embodiments, when a device powers up, a peak detector can keep track of a highest measured voltage, and with the generated predetermined reference voltages as a percentage of the peak voltage (e.g., 1.2V, 2.7V, 4.2V or 5.7V for this example, or a percentage of them), if the device is powered by 2 AA batteries in series, there will be a logic high from the 1.2V and 2.7V comparator outputs, but logic low at the other two. Those two logic levels can be used by digital circuits to control an analog mux 2020 which feeds another comparator 2030 the correct UVLO threshold level for 2 AA batteries (e.g., approximately 2V), and once the measured reference voltage falls below the 2V UVLO threshold level, it triggers the UVLO and turns power off from the device. As illustrated in FIG. 20, the circuit 2000 can include several different static voltage reference thresholds (e.g., static-volt-ref-1, static-volt-ref-2, static-volt-ref-3, static-volt-ref-4) corresponding to different power systems (e.g., one AA battery, two AA batteries, 3 AA batteries, 4 AA batteries, among numerous others) and each threshold can be used to identify the particular power system. The circuit can also include several thresholds (e.g., static_UVLO_Ref_1, static_UVLO_Ref_2, static_UVLO_Ref_3, static_UVLO_Ref_4, among others) that provide a percentage threshold of the detected peak voltage. Accordingly, the comparison logic circuitry can learn a peak voltage of a power system, and automatically configure a threshold for the detected power system. Although FIG. 20 illustrates circuitry for comparison logic that can be used to set various UVLO thresholds based off a "learned" peak voltage and to automatically choose a threshold voltage level for different power systems (e.g., different batteries), any of a variety of circuit architectures can be utilized as appropriate to the requirements of specific applications in accordance with embodiments of the invention.

Figure 21:
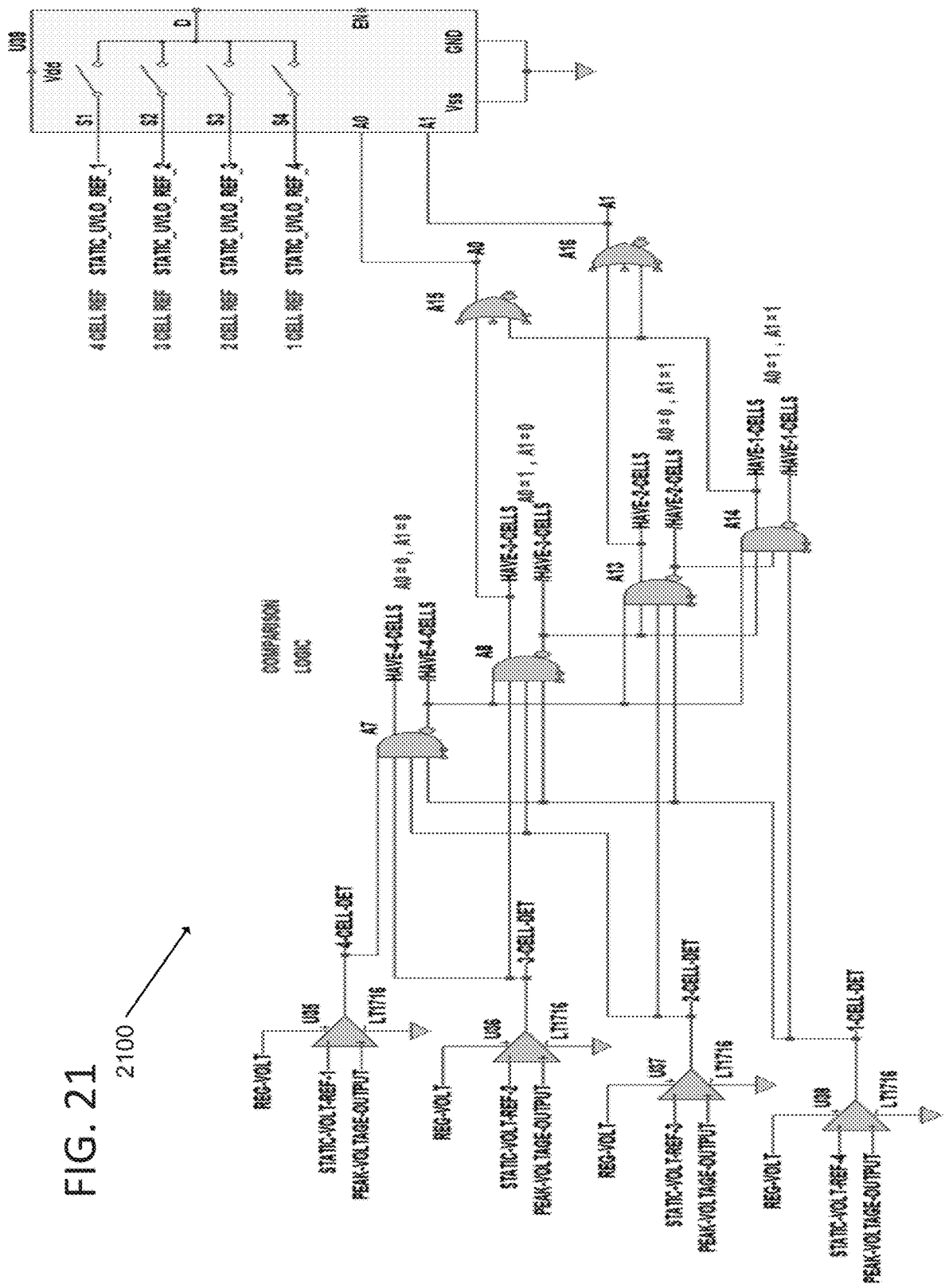
FIG. 21 illustrates circuitry for comparison logic that can be used to set a UVLO level based off a series size (e.g., number of cells), of a battery supplying power in accordance with an embodiment of the invention.

FIG. 21 illustrates circuitry for comparison logic that can be used to set a UVLO level based off a series size (e.g., number of cells), of a battery supplying power in accordance with an embodiment of the invention. The digital "AND", "NAND" and "OR" digital gates is an example of a circuit that detects the battery configuration based off the comparator outputs, and controls an analog mux U31 to switch in the corresponding UVLO threshold level to a final UVLO comparator U39. In particular, the comparison logic circuitry 2100 can include several thresholds for detecting different battery cells, including, for example static-volt-ref-1 for a 4-cell battery detection, static-volt-ref-2 for a 3-cell battery detection, static-volt-ref-3 for a 2-cell battery detection, and static-volt-ref-4 for a 1-cell battery detection. Based on the series size, different UVLO thresholds (e.g. as illustrated in FIG. 21, static_UVLO_ref_1, static_UVLO_ref_2, static_UVLO_ref_3, and static_UVLO_ref_4) can be selected by selection circuit U39.

Although FIG. 21 illustrates circuitry for comparison logic that can be used to set a UVLO level based off a series size of a battery supplying power, any of a variety of circuit architectures can be utilized as appropriate to the requirements of specific applications in accordance with embodiments of the invention.

Figure 22:
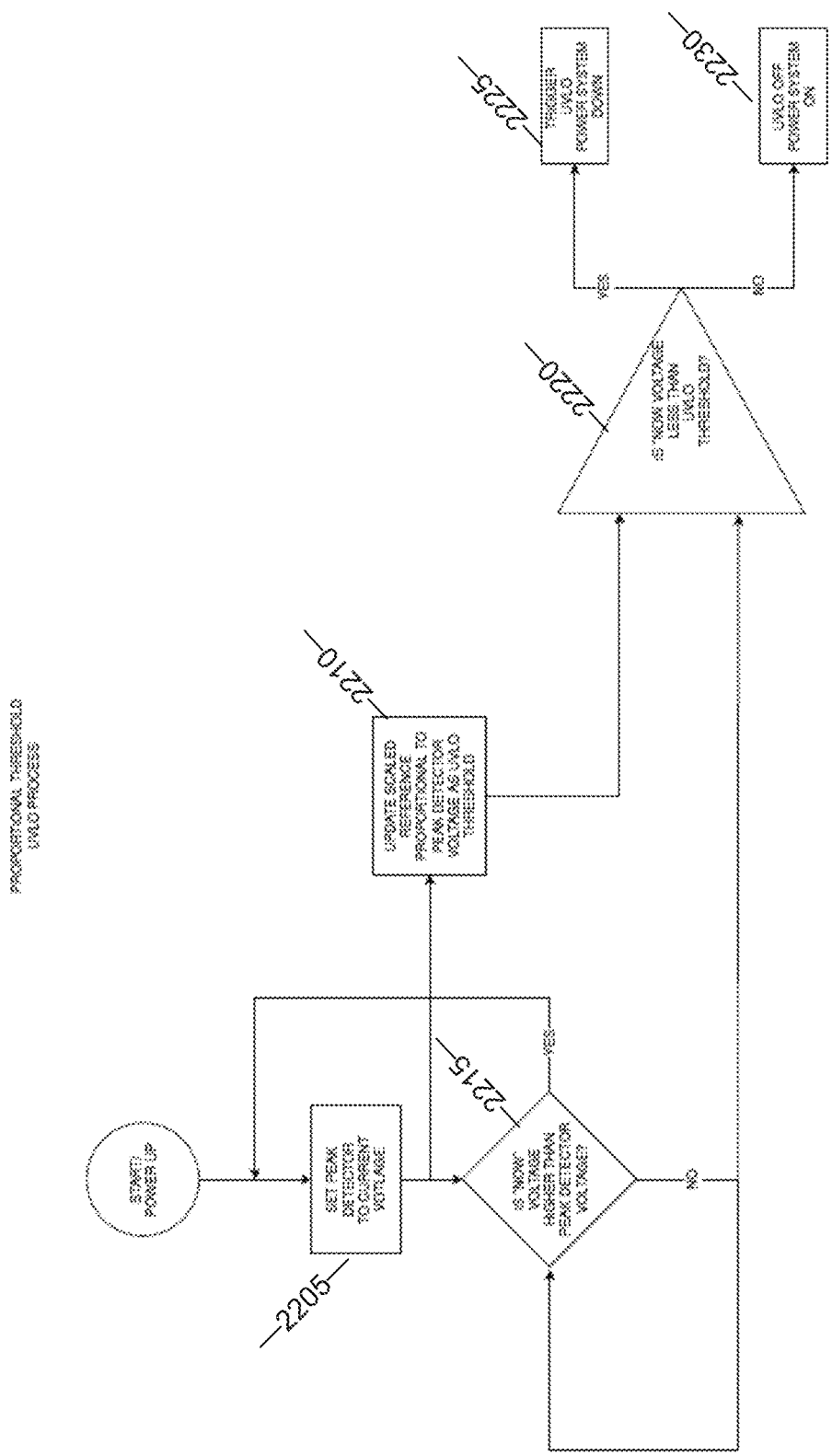
FIG. 22 illustrates a process for proportional threshold UVLO detection in accordance with an embodiment of the invention.

A process for proportional threshold UVLO detection in accordance with an embodiment of the invention is illustrated in FIG. 22. The process sets 2205 a peak detector to a current voltage. The process updates 2210 scaled reference proportional to the peak detector voltage as the UVLO threshold. The process determines 2210 if the "now" voltage is higher than a peak detector voltage. The process returns to 2205 if a positive determination is made. If the now voltage is not higher than the peak detector, the process determines 2220 if the now voltage is less than the UVLO threshold, and, if yes, triggers 2225 the UVLO power system down, and if no, the 2230 UVLO Off, power system on. Specific processes for proportional threshold UVLO configuration in accordance with embodiments of the invention are described above and shown with respect to FIG. 22; however, any number of processes can be utilized as appropriate to the requirements of a specific application in accordance with embodiments of the invention.

Figure 23:
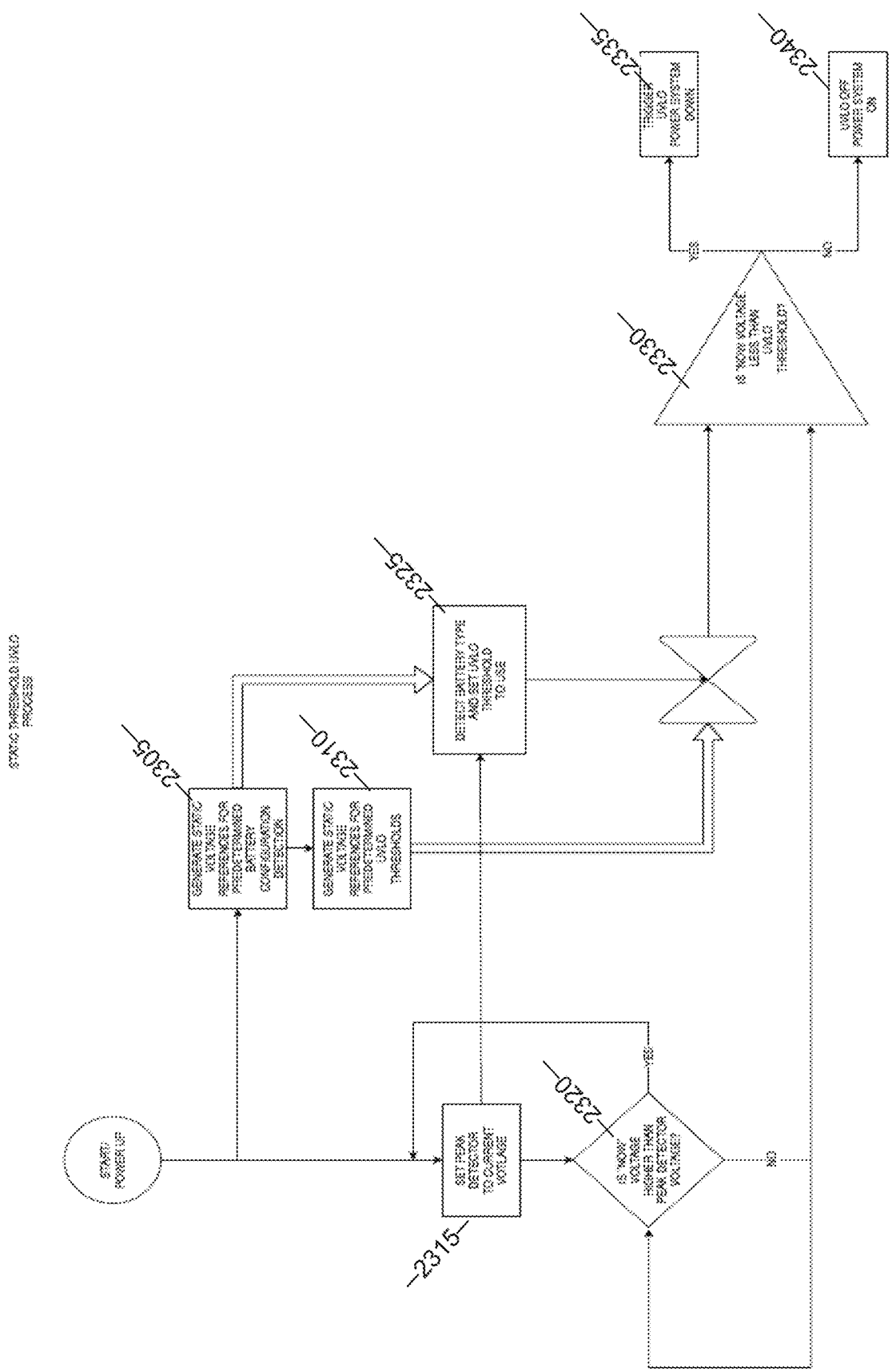
FIG. 23 illustrates a process for static threshold UVLO configuration in accordance with an embodiment of the invention.

A process for static threshold UVLO configuration in accordance with an embodiment of the invention is illustrated in FIG. 23. The process generates (2305) a set of static voltage reference thresholds for a set of predetermined battery configuration detections. The process generates (2310) a set of static voltage references for predetermined UVLO thresholds. The process sets 2315 a peak detector to a current voltage. The process determines (2320) if the "now" voltage is higher than the peak detector voltage, and if positive, returns to 2315, otherwise, the process proceeds to 2330. From 2305 and 2315, the process detects (2325) a battery type and selects a UVLO threshold from the set of UVLO thresholds to use. The process determines (2330) if the now voltage is less than the UVLO threshold, and if yes, the process triggers (2335) UVLO power system down, and if no, the process sets 2340 UVLO off Power System on. Specific processes for static threshold UVLO configuration in accordance with embodiments of the invention are described above and shown with respect to FIG. 23; however, any number of processes can be utilized as appropriate to the requirements of a specific application in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:
1. An under-voltage lockout (UVLO) circuit with automatic UVLO threshold configuration, comprising:
  an over-voltage protection circuit that receives power from a power source;
  a peak detector that detects a peak voltage output for the power source;
  a voltage threshold generator that sets a UVLO threshold based on the peak voltage output; and
  a comparator that compares an instantaneous voltage with the UVLO
  threshold and configures an operating mode of a device based on the comparison.

2. The UVLO circuit of claim 1, wherein the UVLO threshold is set to a percentage of the peak voltage output.

3. The UVLO circuit of claim 1, wherein the UVLO threshold is selected from a plurality of predetermined UVLO thresholds based on the peak voltage output.

4. The UVLO circuit of claim 1, wherein the voltage threshold generator further sets a second UVLO threshold that is less than the UVLO threshold for hysteresis control.

5. The UVLO circuit of claim 1, wherein configuring an operating mode of the device comprises shutting down power to the device when the instantaneous voltage is below the UVLO threshold.

6. The UVLO circuit of claim 1, wherein configuring an operating mode of the device comprises enabling power to the device when the instantaneous voltage is at least equal to the UVLO threshold.

7. The UVLO circuit of claim 1, further comprising a comparator that compares the peak voltage output with a plurality of predetermined threshold values set for different standardized power sources to determine characteristics of the power source.

8. The UVLO circuit of claim 7, wherein the characteristics of the power source are selected from the group comprising a 12V system and a 24V system.

9. The UVLO circuit of claim 7, wherein the characteristics of the power source comprises a number of cells in a battery of the power source.

10. The UVLO circuit of claim 1, wherein the overvoltage protection circuit further comprising:

a fuse with a Zener and clamping diode to cause an open circuit when a voltage across the Zener exceeds a reverse avalanche voltage.

11. The UVLO circuit of claim 1, further comprising a low current sourcing voltage regulator.

12. The UVLO circuit of claim 1, further comprising a sample and hold circuit, wherein an input voltage is sampled with the sample and hold circuit when a voltage set as a last detected peak voltage is less than a voltage from the power source.

13. The UVLO circuit of claim 12, wherein the sample and hold circuit comprises a high impedance input and low impedance output circuit to sample the voltage and charge a capacitor to the sample voltage.

14. The UVLO circuit of claim 1, further comprising a digital pot that comprises a comparator to provide feedback indicating when the digital pot increases, wherein using the incremental tracking feedback sets the peak detector to hold onto the peak voltage.

15. The UVLO circuit of claim 1, wherein the UVLO circuit provides a signal that disconnects power from the power source to the device.

16. The UVLO circuit of claim 1, wherein the UVLO circuit may be programmed at time of production for multiple battery environments.

17. The UVLO circuit of claim 1, wherein the UVLO circuit may be dynamically re-programmed for different battery environments.

* * * * *